United States Patent
Bigdeliazari et al.

(10) Patent No.: US 6,744,764 B1
(45) Date of Patent: Jun. 1, 2004

(54) SYSTEM FOR AND METHOD OF RECOVERING TEMPORAL ALIGNMENT OF DIGITALLY ENCODED AUDIO DATA TRANSMITTED OVER DIGITAL DATA NETWORKS

(75) Inventors: Ali Bigdeliazari, Medway, MA (US); Graham Davies, Chestnut Hill, MA (US); John P. Matias, Newton, MA (US); Steve B. Smith, East Walpole, MA (US)

(73) Assignee: Mapletree Networks, Inc., Norwood, MA (US)

( * ) Notice: Subject to any disclaimer, the term of this patent is extended or adjusted under 35 U.S.C. 154(b) by 0 days.

(21) Appl. No.: 09/464,421

(22) Filed: Dec. 16, 1999

(51) Int. Cl.[7] .............................................. H04L 12/28
(52) U.S. Cl. ...................................................... 370/394
(58) Field of Search ................................ 370/394, 270, 370/384, 493, 522, 351, 379, 352, 516, 389, 509; 709/231, 214; 704/503

(56) References Cited

U.S. PATENT DOCUMENTS

| | | | |
|---|---|---|---|
| 4,270,183 A | 5/1981 | Robinson et al. ............ 364/900 |
| 4,538,259 A | 8/1985 | Moore .......................... 370/60 |
| 4,922,438 A | 5/1990 | Ballweg ..................... 370/85.15 |
| 5,311,511 A | 5/1994 | Reilly et al. .................... 370/84 |
| 5,534,937 A | 7/1996 | Zhu et al. .................... 348/466 |
| 5,541,926 A | 7/1996 | Saito et al. ................. 370/94.2 |
| 5,543,853 A | 8/1996 | Haskell et al. ............... 348/497 |
| 5,565,924 A | 10/1996 | Haskell et al. ............... 348/423 |
| 5,590,101 A | 12/1996 | Itoi ............................... 369/32 |
| 5,602,882 A | 2/1997 | Co et al. ....................... 375/372 |
| 5,790,543 A | 8/1998 | Cloutier ....................... 370/395 |
| 5,805,602 A | 9/1998 | Cloutier et al. ............. 370/516 |
| 5,825,771 A | * 10/1998 | Cohen et al. ................ 370/394 |
| 5,870,087 A | 2/1999 | Chau ........................... 345/302 |
| 5,999,985 A | * 12/1999 | Sebestyen .................... 709/247 |
| 6,377,931 B1 | * 4/2002 | Shlomot ...................... 704/503 |
| 6,434,606 B1 | * 8/2002 | Borella et al. ............... 709/214 |

OTHER PUBLICATIONS

Rockwell Semiconductor Systems, "AnyPort Multi–Service Access Processor," brochure.

* cited by examiner

*Primary Examiner*—Chi Pham
*Assistant Examiner*—Alexander O. Boakye
(74) *Attorney, Agent, or Firm*—McDermott, Will & Emery

(57) ABSTRACT

A system for receiving and re-sequencing a plurality of digital data chunks after transmission across a digital data network, so as to recover the natural temporal order of the data chunks as defined at the transmitter, including a chunk sorter for storing the, digital data chunks in a data buffer. The system thereafter sequentially transfers, at a chunk transfer rate compatible with the system playout rate, the digital data chunks to a playout destination according to the natural temporal order. The system further includes a chunk sequence analyzer for measuring the average time that the digital data chunks remain in the data buffer. The chunk sequence analyzer adjusts the playout rate so as to balance an increase in the average time, with an amount of data chunks lost due to arriving late and missing a playout deadline.

39 Claims, 13 Drawing Sheets

SYSTEM FOR AND METHOD OF RECOVERING TEMPORAL ALIGNMENT OF DIGITALLY ENCODED AUDIO DATA TRANSMITTED OVER DIGITAL DATA NETWORKS

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to the transmission of encoded speech over packet-switched data networks that provide connectionless, best-effort (non-guaranteed) delivery, such as Internet Protocol (hereinafter "IP") networks. More particularly, the invention relates to the recovery of a relative alignment in time of separately transmitted segments of speech so as to best approximate the user experience of conversing over the connection-oriented, circuit-switched infrastructure of the Public Switched Telephone. Network (hereinafter "PSTN").

The development of far-reaching data networks initially sponsored by corporate, education and governmental needs has in recent years exploded due to the interest in the Internet shown by the general public. As access to such networks becomes more widespread and the carrying capacity increases, new uses for them are being continually devised. A significant emerging use is the transport of real-time speech between users who would otherwise place telephone calls on the conventional PSTN.

The factors motivating the transmission of speech over data networks as opposed to the PSTN are economic and logistical:

1. incumbent local exchange and long distance telephone carriers are proving difficult to displace from traditional services such as PSTN telephony and therefore maintain fee levels consistent with captive consumers;
2. the provision of Internet access is highly competitive and fees are either flat or based only on time, never on the geographical span of communication;
3. corporate information services managers have significant investment in data networks and are motivated to make use of spare capacity;
4. the management of a single corporate network for data and voice is attractive as compared to separate networks;
5. the PSTN is itself slowly migrating to packet-based technology where speech is considered one among many sources of data for transport.

Using data networks for speech can thus be expected to begin with Internet telephony for long distance charge avoidance and migrate through unconventional access such as wireless and cable modem to fully integrated data/telephony networks.

Significant problems that need to be overcome in the use of data networks to carry real-time, two-way speech relate to the fundamental properties of packet-switched data networks as opposed to circuit-switched networks such as the PSTN. These properties derive from the same differences in operation that make packet-switched networks more efficient and flexible than circuit-switched networks:

1. continuous information, such as speech, must be divided into blocks (packets) at the transmitter, each of which is conveyed over the network separately and must be reassembled at the receiver into the original form;
2. the multiplexing of information packets across network links is performed in a statistical fashion rather than by assignment to pre-allocated transmission slots as in circuit-switched networks;
3. due to statistical multiplexing, packets must be queued for entry to the network and at switching points within the network, both of which introduce significant transfer delay as compared to circuit-switched networks;
4. as packets contend with other packets for transmission capacity, they experience variable transfer delays, particularly during periods of network congestion (load approaching the upper limit);
5. severe network congestion and transmission errors can both cause packets to be dropped and therefore not reach their destination.

In addition, connectionless, best-effort data networks, such as IP networks, have the following properties:

6. both transfer delay and the variation of transfer delay from packet to packet can be many tens of milliseconds;
7. large changes in transfer delay can occur as the network resolves the route that packets should take over the network;
8. changes in route can cause packets to arrive at the destination in a different order to that in which they were transmitted;
9. packets may occasionally take multiple routes, resulting in duplicates of the same packet arriving at the destination;
10. severe congestion is quite common since, in a connectionless network, the network switching/routing elements cannot (without pseudo-connection-oriented reservation protocols, such as RSVP, yet to be widely deployed) predict or control the load offered for transport;
11. accepted congestion alleviation strategies include discarding (dropping) groups of consecutive packets from a source (transmitter).

It is an object of the present invention to reassemble packetized, encoded speech information transmitted over an IP or similar network with the above characteristics so as to offer to the users an experience as close as possible to the use of the traditional, circuit-switched telephony network.

SUMMARY OF THE INVENTION

The foregoing and other objects are achieved by the invention, a system for recovering the temporal alignment of digitally encoded speech information transmitted over connectionless, best-effort delivery, packet-switched data networks. In general, the system operates on a plurality of digital data chunks that are sequentially generated by a data transmitter according to a natural temporal order and time alignment, and are transmitted across a digital data network to a receiver, such that the digital data chunks arrive at the receiver in a received temporal order substantially independent of the natural temporal order, and a received time alignment substantially independent of the natural time alignment. The system re-sequences and re-aligns the plurality of digital data chunks at the receiver so as to transform the received temporal order into the natural temporal order and the received time alignment into the natural time alignment. In one aspect, the system comprises a chunk sorter for storing the digital data chunks in a data buffer and thereafter sequentially transferring, at a chunk transfer rate compatible with a playout rate, the digital data chunks to a playout destination according to the natural temporal order. The system further includes a chunk sequence analyzer for measuring an average time that the digital data chunks remain in the data buffer. The chunk sequence analyzer also adjusts the playout rate so as to balance an increase in the average time, with an amount of data chunks lost due to arriving late and missing a playout deadline.

In one embodiment of the invention, the digital data network includes a best effort delivery, packet-switched network.

In another embodiment of the invention, the chunk sorter further includes a packet unassembly buffer for receiving a plurality of packets of the digital data chunks, a jitter buffer having a plurality of storage slots for storing the data chunks, and a digital signal processor for receiving the data chunks from the jitter buffer and sequentially playing out the data chunks in the natural temporal order at the playout rate.

In another embodiment of the invention, the chunk sorter transfers each of the digital data chunks from the packet unassembly buffer to the jitter buffer in an order corresponding to a relative sample time associated with each of the data chunks.

In another embodiment of the invention, the relative sample time is a predetermined function of a timestamp associated with each of the plurality of packets.

In another embodiment of the invention, the chunk sorter zero-fills the storage slots so as to accommodate data chunks having a data width less than a width of the storage slots.

In another embodiment of the invention, the chunk sequence analyzer further includes a chunk holding time calculator for determining a chunk holding time for each of the data chunks in the data buffer. The chunk sequence analyzer also includes a mean holding time calculator for receiving the chunk holding time corresponding to each of the data chunks, and averaging a predetermined number of the chunk holding times, so as to produce a mean holding time that corresponds to a set of data chunks in the data buffer. The chunk sequence analyzer also includes a smoothed mean holding time calculator for receiving the mean holding time corresponding to each of the sets of data chunks in the data buffer, and for averaging a predetermined number of the mean holding times within a time window, so as to produce a smoothed mean holding time.

In another embodiment of the invention, the holding time calculator calculates a total holding time $T_N$ for N data chunks in the data buffer, at a time that an $N^{th}$ data chunk is stored in the data buffer. The total holding time $T_N$ includes a sum of a next preceding total holding time $T_{N-1}$, an aging term $E_N$, and a chunk holding term CN.

In another embodiment of the invention, the mean holding time calculator calculates a mean holding time $H_N$ for N data chunks in the data buffer at a time that an $N^{th}$ data chunk is stored in the data buffer. The mean holding time $H_N$ includes a product of the total holding time $T_N$ and 1/N.

In another embodiment of the invention, the chunk sorter initiates a transfer of the data chunks in the data buffer to the playout destination when the mean holding time $H_N$ equals or exceeds a predetermined holding time goal.

In another embodiment of the invention, the chunk sequence analyzer further associates an arrival time with each of the data chunks according to a playout clock associated with the digital signal processor.

In another embodiment of the invention, upon playout of the data chunks, the holding time calculator calculates, for each of the data chunks, a chunk holding time being a difference between a head playout time and an arrival time of the data chunk.

In another embodiment of the invention, the mean holding time calculator calculates, for a set of K data chunks, a mean holding time being a product of (a) a sum of K chunk holding times corresponding to the set of K data chunks, and (b) 1/K.

In another embodiment of the invention, the sum of K chunk holding times includes K consecutive chunk holding times.

In another embodiment of the invention, the smoothed mean holding time calculator calculates, for a set of J mean holding times, a smoothed mean holding time being a product of (a) a sum of J mean holding times and (b) 1/J.

In another embodiment of the invention, the sum of J mean holding times includes J consecutive mean holding times.

Another embodiment of the invention further includes a playout adjustment selector for receiving the mean holding time, the smoothed mean holding time and a holding time goal, and provides a playout adjustment signal to the digital signal processor. The playout adjustment signal adjusts the playout rate, and is a predetermined function of the mean holding time, the smoothed mean holding time and the holding time goal.

In another embodiment of the invention, the predetermined function compares the mean holding time to the holding time goal, provides an advance playout command via the adjustment signal if the mean holding time is larger than the holding time goal, and provides a retard playout command via the adjustment signal if the mean holding time is smaller than the holding time goal.

In another embodiment of the invention, the predetermined function compares the smoothed mean holding time to the holding time goal, provides an advance playout command via the adjustment signal if the smoothed mean holding time is larger than the holding time goal, and provides a retard playout command via the adjustment signal if the smoothed mean holding time is smaller than the holding time goal.

In another embodiment of the invention, the predetermined function compares the mean holding time to the holding time goal so as to produce a comparison value, and provides the adjustment signal such that an adjustment magnitude corresponds to the comparison value.

In another embodiment of the invention, the chunk sequence analyzer further includes a holding time goal adapter for adjusting a chunk holding time goal. The holding time goal adapter determines, for each data chunk, an arrival margin by which the data chunk either achieves storage in the data buffer prior to playout, or does not achieve storage in the data buffer due to missing the playout deadline. The holding time goal adapter further sorts the arrival margins into a predetermined set of arrival margin bins, and adjusts the chunk holding time goal as a predetermined function of the sorted arrival margins.

In another embodiment of the invention, the arrival margin is a predetermined function of an associated chunk holding time, an associated smoothed mean holding time, and a previous holding time goal value.

In another embodiment of the invention, the chunk holding time goal is further a predetermined function of a loss tolerance value and a margin value width of the arrival margin bins.

In another aspect, the invention comprises a first software module for storing speech data packets in a data buffer as the packets arrive from a data network, and for retrieving the data packets from the data buffer in the natural temporal order and at a time at which the speech data packets should be played out to a receiving party. The apparatus further comprises a second software module for measuring and adjusting an average time that the speech data packets spend in storage, so as to balance an additional delay with an occurrence of the speech data that arrives from the data network too late for playout.

In another embodiment of the invention, the data network provides best-effort, connectionless service such that the packets conveyed thereby are subject to transit delay, variation in transit delay from one packet to another, packet loss, packet duplication, and out-of-order packet delivery.

In another embodiment of the invention, the data network is operated according to Internet Protocol, and includes, but is not limited to, corporate private networks operating according to Internet Protocol, and the public Internet.

In another embodiment of the invention, the packets of encoded speech data are transported over the Internet Protocol data network using a Real-Time Transport Protocol.

In another embodiment of the invention, the sequence in which the encoded speech data is played out is recovered by storage in a Jitter Buffer, according to a relative playout time value provided by a packet protocol header, and independent of the packet arrival order.

In another embodiment of the invention, the digitally encoded speech is encoded according to a frame-based encoding method such as ITU-T Recommendations G.723.1 and G.729. Fixed or variable-size frames of encoded speech data are generated at a transmitter, and a complete frame must be available at a receiver in order for it to be played out as reconstructed audio.

In another embodiment of the invention, the digitally encoded speech is encoded according to a sample-based encoding method such as ITU-T Recommendations G.711, G.726 and G.727. A continuous stream of speech waveform samples are generated at a transmitter, division into packets for transport on the data network is arbitrary and, any number of adjacent samples at the receiver can be played out as reconstructed audio.

In another embodiment of the invention, the digitally encoded speech passes continuously from a transmitter towards a receiver without regard to periods during which a user at the transmitter is not speaking.

In another embodiment of the invention, a transmitting station includes means of detecting that the user is not speaking and the transmitting station sends an indication of a background noise characteristic to a receiver, followed by no further encoded data until speech resumes.

In another embodiment of the invention, the transmitting station periodically sends updates of the background noise characteristic to the receiver.

In another embodiment of the invention, the Jitter Buffer is divided into storage partitions into each of which encoded speech data representing a known time interval is stored, and the time interval is configurable according to the speech encoding method in use.

In another embodiment of the invention, the storage partitions are arranged by a software module, in a fixed order, representing the natural temporal order.

In another embodiment of the invention, each frame received in a packet on the data network is stored in an individual storage partition of the Jitter Buffer.

In another embodiment of the invention, the samples received in a packet on the data network are distributed into the storage partitions of the Jitter Buffer such that each partition contains an amount of data representing a selected partition time interval.

In another embodiment of the invention, a selection of storage partitions is made with reference to information about an encoder's relative sampling time included in the packet header by the transmitter.

In another embodiment of the invention, the apparatus, while decoding and playing out speech, maintains a playout clock, advancing in step with speech playout. Each storage partition is labeled with a value of the playout clock when the partition is filled with data, for the purpose of measuring the time the data spends in storage between arrival and playout.

In another embodiment of the invention, the average time spent in storage by encoded speech data is measured by processing the storage time of the data in each successive storage partition with accumulate-and-dump and/or sliding window averaging and smoothing algorithms, so as to reduce fluctuations due to stochastic variations in packet delay.

BRIEF DESCRIPTION OF DRAWINGS

The foregoing and other objects of this invention, the various features thereof, as well as the invention itself, may be more fully understood from the following description, when read together with the accompanying drawings in which:

FIG. 3b shows a second view of the procedure shown in FIG. 3a;

FIG. 3c shows a third view of the procedure shown in FIG. 3a;

FIG. 3d shows a fourth view of the procedure shown in FIG. 3a;

FIG. 4b shows a second view of the procedure shown in FIG. 4a;

FIG. 4c shows a third view of the procedure shown in FIG. 4a;

FIG. 4, shows a fourth view of the procedure shown in FIG. 4a;

FIG. 5b shows a second view of the procedure shown in FIG. 5a;

FIG. 5c shows a third view of the procedure shown in FIG. 5a;

FIG. 5d shows a fourth view of the procedure shown in FIG. 5a;

DESCRIPTION OF THE PREFERRED EMBODIMENTS

Figure 1:
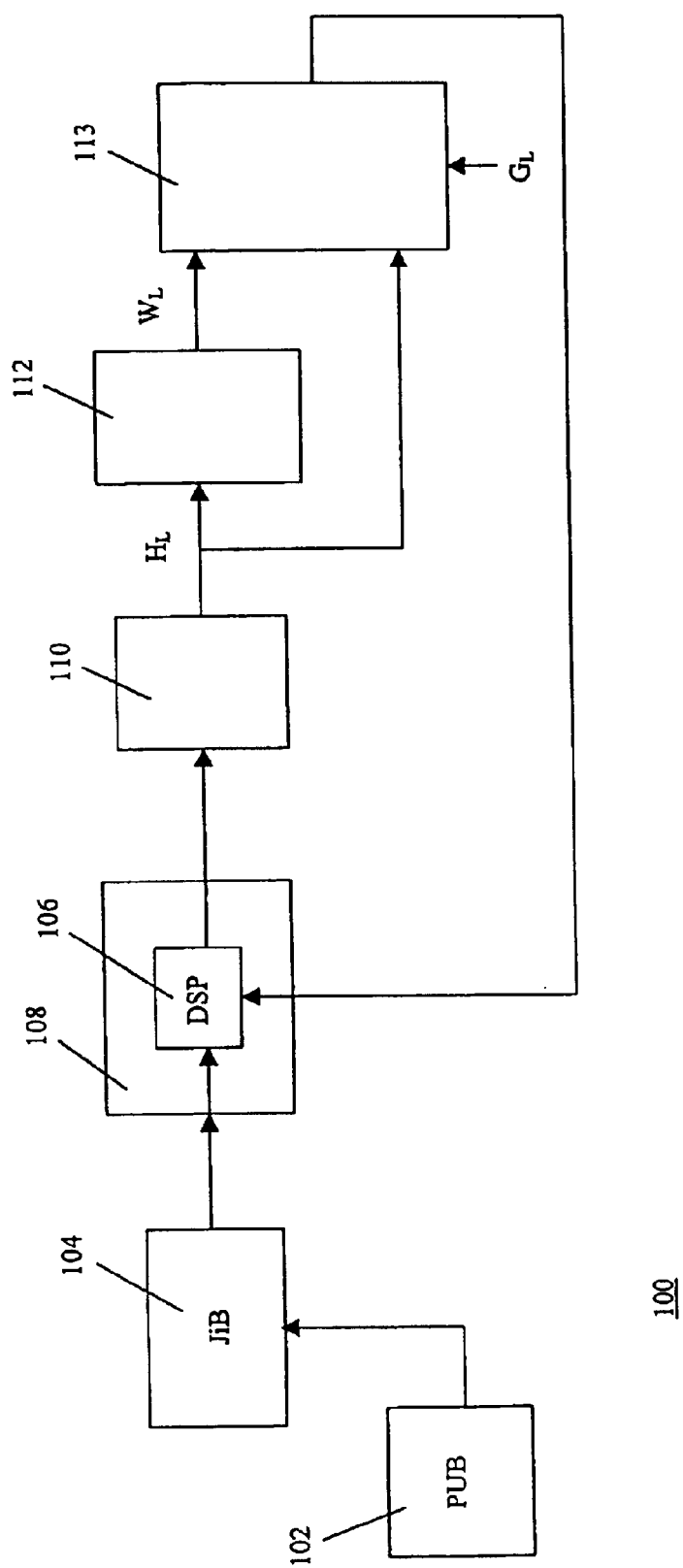
FIG. 1 illustrates a block diagram view of one preferred embodiment of a jitter buffer system according to the present invention.

FIG. 1 illustrates one preferred embodiment of a jitter buffer system 100 for recovering temporal alignment of digitally encoded audio information transmitted over connectionless, best-effort delivery, packet-switched data networks. For the exemplary embodiments described herein, the audio information particularly includes speech, although the present invention may be used to process other types of audio information, such as music, motion picture sound tracks, modulation tones, et al. In general, the jitter buffer system includes a data chunk sorter and a data chunk sequence analyzer. The data chunk sorter stores incoming data chunks in a data buffer, and then transfers the data chunks to a playout destination according to the natural temporal order and the natural time alignment defined at the transmitter. The data chunk sequence analyzer measures the average time that the digital chunks remain in the data buffer prior to playout. The data chunk sequence analyzer further adjusts the playout rate of the data chunks so as to balance an increase in the average time, with the number of data chunks lost because they arrived late and missed their playout deadlines.

The jitter buffer system 100 of FIG. 1 includes a Packet Unassembly Buffer 102 (hereinafter "PUB"), a Jitter Buffer 104 (hereinafter "JiB"), a Digital Signal Processor 106 (hereinafter "DSP"), a chunk holding time calculator 108, a mean holding time calculator 110, a smoothed mean holding time calculator 112, and a playout adjustment selector 113. The jitter buffer system 100 represents one particular embodiment of the present invention; alternate embodiments that include other processing features are further described herein.

A more detailed description of the PUB 102, the JiB 104, and the DSP 106 components of the jitter buffer system 100 is provided by FIGS. 1a, 1b, 1c, and 1d. The packets containing digitally encoded speech data are temporarily stored, upon reception from the data network, in the PUB 102. Each packet of speech data consists of one or more pieces of data 114 (referred to herein as "data chunks," or more simply "chunks"). Each data chunk 114 within a packet represents an amount of speech data compatible with the playout function (also referred to herein as "playout destination") within the DSP 106. The system 100 moves chunks 114 of speech data from the PUB 102 to storage in the JiB 104, where they remain until later moved to DSP 106 for decoding and playout as continuous audio. The interface of the PUB 102 to the data network and the interface of the DSP 106 to the telephony network or other device for conveying audio signals to a listener are not shown in the accompanying figures.

Figure 1A:
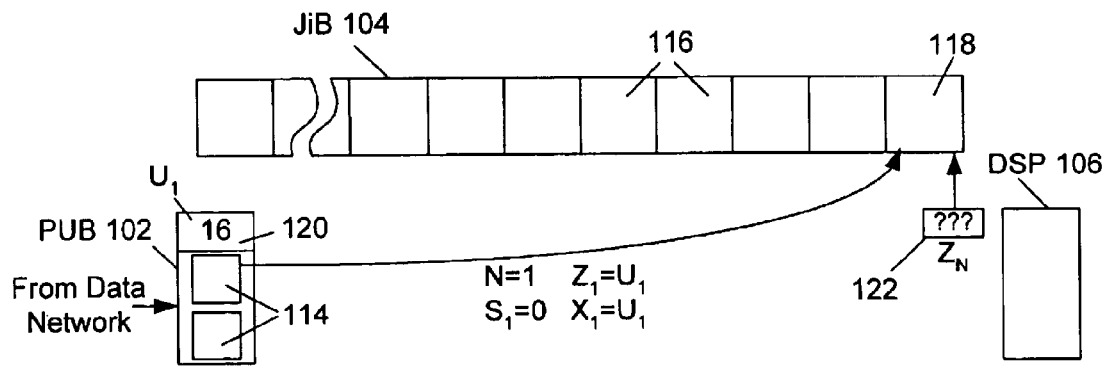
FIG. 1a illustrates a block diagram view of the storage of digitally encoded speech data in the embodiment shown in FIG. 1.

FIG. 1a represents a state of the system 100 in which the JiB 104 is empty and the first packet containing encoded speech data arrives from the data network in the PUB 102. This state exists at the start of a new connection and after significant disruptions of service such as reconfiguration of the data network. The JiB 104 is arranged as an ordered series of storage partitions 116 (hereinafter "slots") with the rightmost slot referred to as the "head slot" 118. The chunk of speech data 114 in the PUB 102 that the transmitter generated earliest in time is moved to the head of the JiB 104. Knowledge of the encapsulation protocol of the packet in the PUB 102, provided by external configuration information, facilitates the location of this chunk 114. Similarly, knowledge of the manner of speech encoding, either provided by external configuration information or indicated by header information in the packet or contained in the chunk 114 itself, allow the size of the chunk 114 to be determined. Encapsulation protocols particularly suited for use on best-effort connectionless networks, for example the Real-Time Transport Protocol (hereinafter "RTP"), include, in the packet header 120, an indication of the relative time at which the enclosed speech data was sampled at the transmitter (hereinafter "packet timestamp"). The packet timestamp of the No packet arriving from the data network is denoted by $U_N$, where N is an indexing integer. The JiB 104 incorporates a head timestamp 122 that provides an indication of the relative time at which the speech data in the head slot 118 should be played out. The head timestamp 122 when the $N^{th}$ chunk of encoded speech data is offered for storage of the JiB 104 is denoted herein by $Z_N$. When the first chunk of data is moved from a packet into the JiB 104 head slot 118, the corresponding packet timestamp is copied to the head timestamp 122:

$Z_1 = U_1$

Figure 1B:
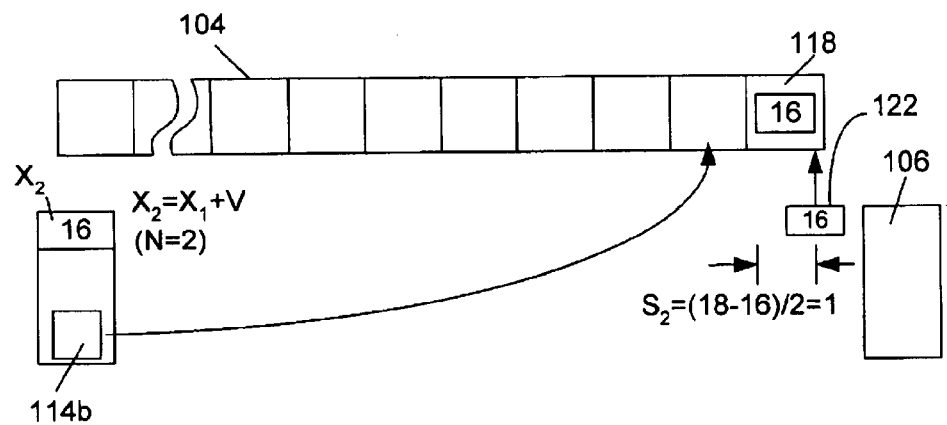
FIG. 1b illustrates a second block diagram view of the storage of digitally encoded speech data in the embodiment shown in FIG. 1

FIG. 1b illustrates the state of the system 100, in particular the JiB 104, after the first chunk of speech data has been moved from the PUB 102 to the head slot 118. This chunk 114 is annotated in FIG. 1b with the relative time at which its speech data should be played out (hereinafter "chunk timestamp"). The chunk timestamp of the $N^{th}$ chunk stored in the JiB 104 is denoted herein by $X_N$. Thus, the chunk timestamp at the head slot 118 matches the head timestamp 122. Software associated with the PUB 102 computes the chunk timestamp of the next chunk (designated by the reference number 114b in FIG. 1b) contained in the packet. Information regarding the manner of speech encoding, either provided by external configuration information or indicated by header information in the packet, allows the playout time interval represented by the previously removed chunk (hereinafter "chunk interval") to be determined. The chunk interval (denoted herein by V), when added to the previous chunk timestamp (for the first chunk, the packet timestamp), gives the next chunk timestamp. In FIGS. 1a, 1b, 1c and 1d, the time interval represented by each chunk 114 has been chosen to be 2 (i.e., V=2), for illustration purposes only, and is not representative of actual speech encoding methods and encapsulation protocols. A realistic example using G.723.1 speech encoding and RTP encapsulation would correspond to a time interval of 80 units, where each unit is 125 μs. Software associated with the JiB 104 computes the slot $S_N$ in which the next chunk from the packet should be stored using the chunk timestamp $X_N$, the head timestamp $Z_N$ and the chunk interval V as follows:

$$S_N=(X_N-Z_N)/V$$

Slots are numbered from the head, which is 0, to O-1, where O is the number of slots in the JiB 104, chosen as a compromise between memory usage and the maximum packet delay variation that can be accommodated as described herein. In FIG. 1b, the second chunk from the first packet will necessarily be moved to slot 1. This second slot is the last chunk in the packet, but the choice of two chunks per packet is for illustration purposes only, and other numbers of chunks per packet are also possible.

Figure 1C:
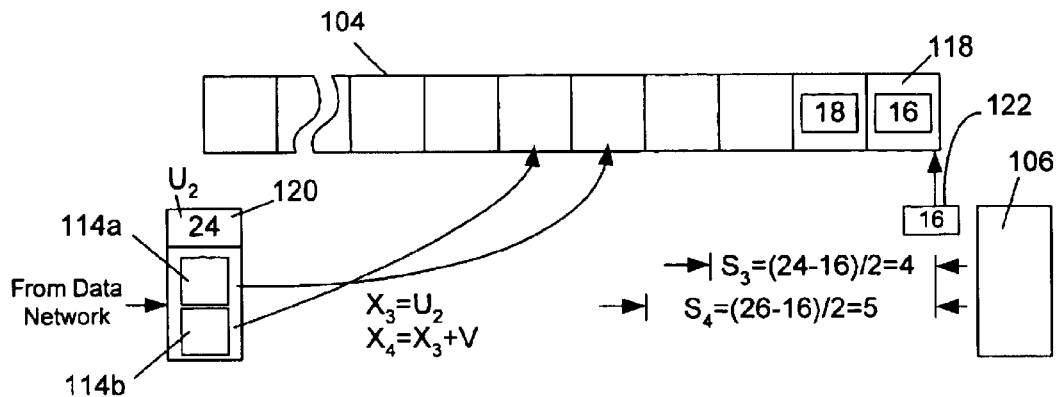
FIG. 1c illustrates a third block diagram view of the storage of digitally encoded speech data in the embodiment shown in FIG. 1

FIG. 1c illustrates the state of the system 100 in which another packet arrives in the PUB 102 from the data network. The packet timestamp is shown to have a value of 24 to illustrate the treatment of packets that arrive out of natural time sequence. The first chunk 114a has a chunk timestamp equal to the packet timestamp and the calculation of the slot to which it should be moved yields 4. The chunk timestamp of the second chunk 114b is calculated as 26 (the chunk interval V is added to the packet timestamp 120) and this chunk is therefore moved to slot 5. After processing this packet, slots 2 and 3 are empty, leaving a "hole" in the JiB 104.

Figure 1D:
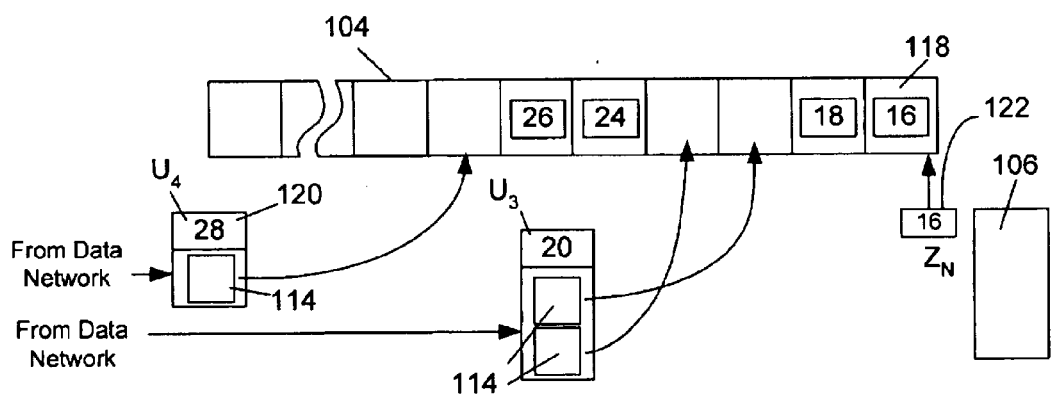
FIG. 1d illustrates a fourth block diagram view of the storage of digitally encoded speech data in the embodiment shown in FIG. 1

In FIG. 1d illustrates further packets arriving and the encoded speech data chunks they carry being stored in the JiB 104. For illustration purposes, a packet with a timestamp of 20 arrives and results in the above-mentioned hole being filled. A packet with a timestamp of 28 arrives containing only one chunk, illustrating the independence of the process from the number of chunks in a packet.

Two situations can arise in which a chunk cannot be stored in the JiB 104. In the first situation, the slot computed as described above results in a slot number that is a negative number. In the second situation, the slot computed as described above results in a slot number of O or greater. In neither case is there a slot corresponding to the computed number. In the first situation, $S_N$ will be negative if $X_N<Z_N$, that is the chunk timestamp is less than the head timestamp. The encoded speech data in the chunk cannot be played out because the time at which its playout should have begun has passed. The chunk is classified as "late" and discarded. In the second situation, $S_N$ will be O or greater if $X_N \geq Z_N +$ (O×V). The encoded speech data in the chunk is due for playout "far" into the future and O, the number of slots in the JiB 104, has been chosen such that the chunk cannot be stored. It is classified as "early" and discarded. The choice of O should be made to minimize the likelihood of early data subject to the cost and availability of encoded speech data storage in the apparatus. For network management purposes, counts of the number of packets that experience total or partial discard and/or the total duration of discarded speech because of late or early arrival may be kept.

FIGS. 2a through 2d illustrate the embodiment of the system 100 shown in FIGS. 1a through 1d, further retrieving speech data from storage in the order and at the time at which the speech should be played out to the receiving party.

Figure 2A:
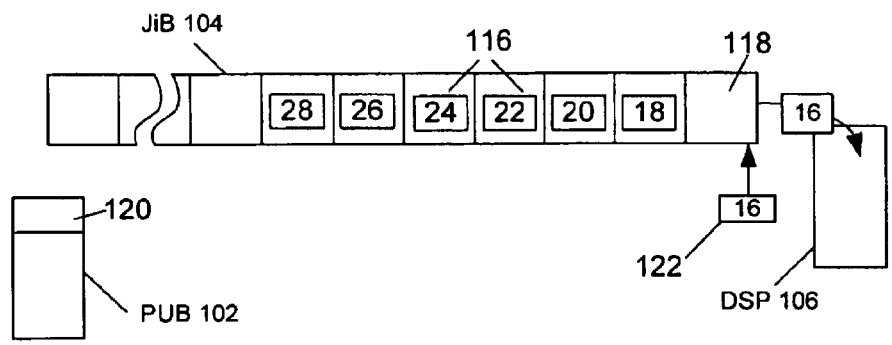
FIG. 2a illustrates a block diagram view of the retrieval from storage of digitally encoded speech data for decoding and playout for the embodiment of FIG. 1.

In FIG. 2a, the packets shown in FIG. 1d have been moved into the JiB 104. System software associated with the JiB 104 determines the mean time for which the encoded speech data now in storage in the JiB 104 will be held in the JiB 104, including the time from when each data chunk arrives from the data network until the chunk is played out as audio to the receiving party. The system software associated with the JiB 104 further determines whether the amount of time the encoded data is held in the JiB 104 meets or exceeds a predetermined goal (typically externally configured). The purpose of these determinations, and the means by which they are achieved, are described herein. At the time represented in FIG. 2a, the DSP 106 contains no encoded speech data for playout. The chunk of data at the head slot 118 of the JiB 104 is moved into the DSP, and the playout of the encoded speech begins.

Figure 2B:
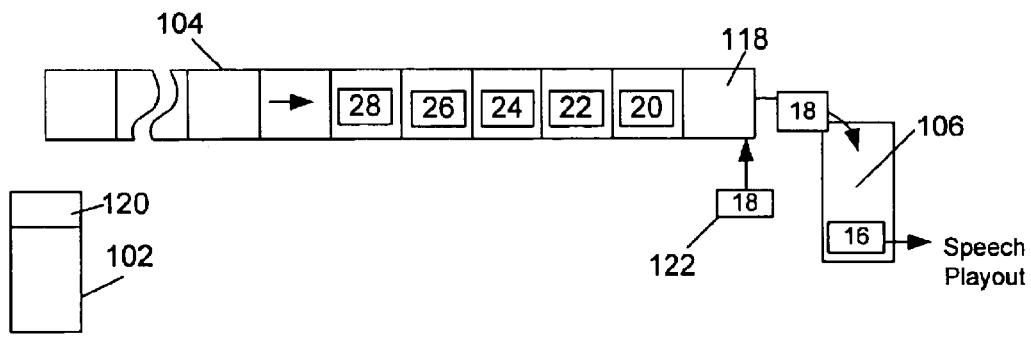
FIG. 2b illustrates a second block diagram view of the retrieval from storage of digitally encoded speech data for decoding and playout for the embodiment of FIG. 1.

FIG. 2b illustrates the situation after the movement of the first chunk to the DSP. Playout of this chunk is in process. The chunks in each slot of the JiB 104 have advanced to the next lower numbered slot, so that a new chunk occupies the head slot 118. This chunk is, by virtue of the method by which chunks are entered into the JiB 104 described above, the chunk that is next due for playout. The head timestamp is advanced by one chunk interval. The movement of chunks between slots is accomplished by software associated with the JiB 104 using array index and/or pointer manipulation techniques. This decreases the execution time of this operation by avoiding movement of data between physical memory locations. Storage is still available in the DSP 106 for additional chunks of data. The new chunk of data at the head of the JiB 104, having a chunk timestamp of 18, will be moved into the DSP 106.

Figure 2C:
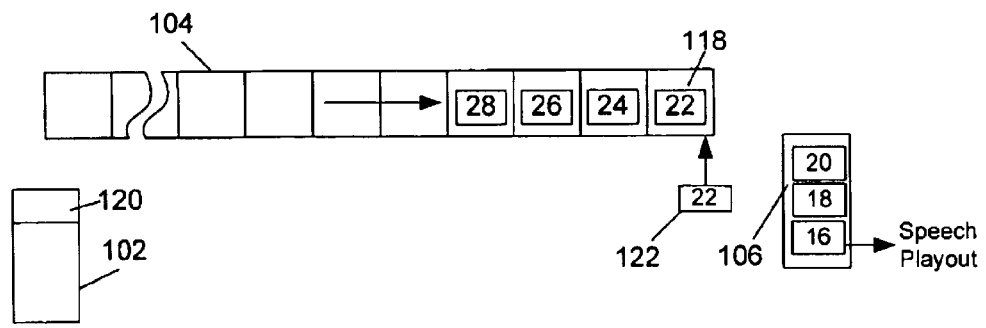
FIG. 2c illustrates a third block diagram view of the retrieval from storage of digitally encoded speech data for decoding and playout for the embodiment of FIG. 1.

The situation when a number of chunks have been moved to the DSP 106 such that the DSP 106 has insufficient storage for an additional chunk is illustrated in FIG. 2c. The choice of three chunks in the DSP 106 has been chosen for illustration purposes only. Chunks in the JiB 104 have moved to lower numbered slots as each chunk is moved from the head to the DSP 106. At the same time, the chunk interval has been added to the head timestamp for each such chunk movement. No further processing is carried out until either playout of a chunk by the DSP 106 completes or a new packet arrives in the PUB 102 from the data network.

Figure 2D:
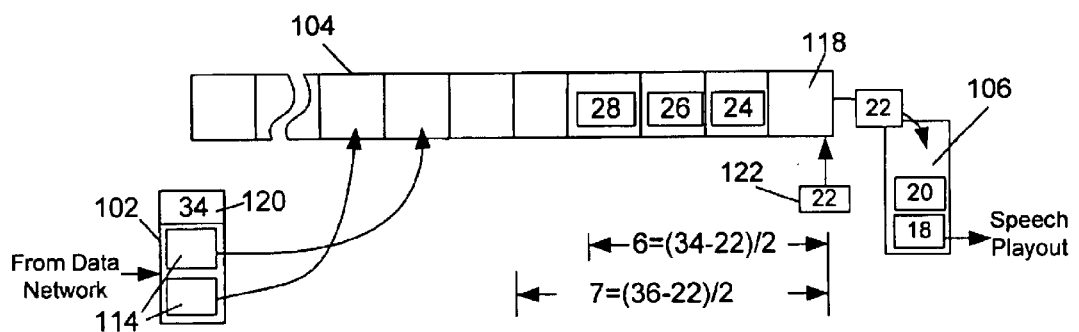
FIG. 2d illustrates a fourth block diagram view of the retrieval from storage of digitally encoded speech data for decoding and playout for the embodiment of FIG. 1.

In FIG. 2d, the DSP 106 has completed the playout of the encoded speech data chunk with a chunk timestamp of 16. This chunk is discarded from storage and the playout of the next chunk begins. Chunks enter the DSP 106 from the JiB 104 and are played out in strict first-in, first-out (hereinafter "FIFO") fashion. This is illustrated in the figures by chunks "dropping" down from the top of DSP 106 storage, where chunks are moved from the JiB 104, to the bottom, where a chunk, if present, is played out. When the system 100 detects storage space in the DSP sufficient for a new chunk, the system 100 moves the chunk at the head of the JiB 104 to the DSP 106, and moves the remaining chunks in the JiB 104 towards the head slot 118 as described herein. FIG. 2*d* also illustrates the arrival of a new packet on the data network. Chunks carried by the packet are moved into slots in JiB 104 storage. The system 100 determines the slot in which each chunk will be stored as described above, considering that the head timestamp 122 has advanced as chunks were moved to the DSP 106.

FIG. 3 illustrates the embodiment of the system 100 shown in FIGS. 1*a* through 1*d*, further describing a situation in which the encoded speech data required for playout is not present in JiB 104 storage.

Figure 3A:
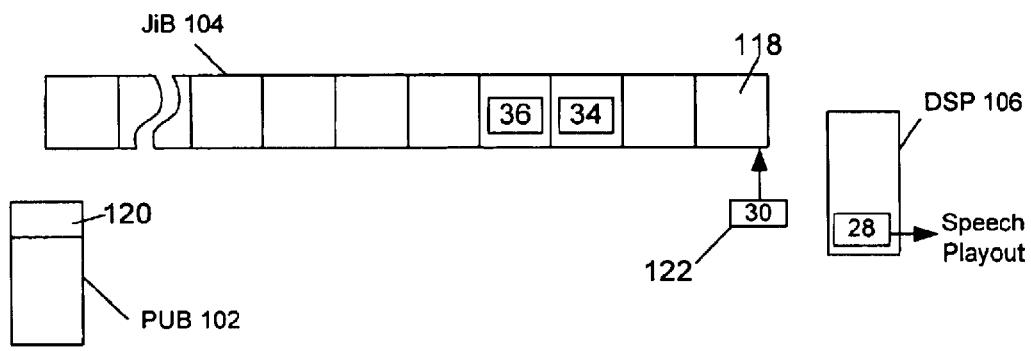
FIG. 3a shows details, in block diagram form, of the frame loss concealment procedure in the embodiment of FIG. 1.

FIG. 3*a* shows the state of the apparatus that will exist if, after the situation of FIG. 2*d* is established, no further packets arrive from the data network while the speech data in five chunks is decoded and played out by the DSP. The chunk with timestamp 28 is undergoing playout and the head timestamp is 30. Because the head of the JiB 104 is empty, no data is available to move to DSP storage after the chunk identified with timestamp 28, and the chunks in slots 2 and 3 are not advanced. This situation exists until either a packet arrives on the data network carrying the missing chunk with timestamp 30 or the time at which the playout of the chunk with timestamp 30 must begin (hereinafter referred to as the "playout deadline") passes.

Figure 3B:
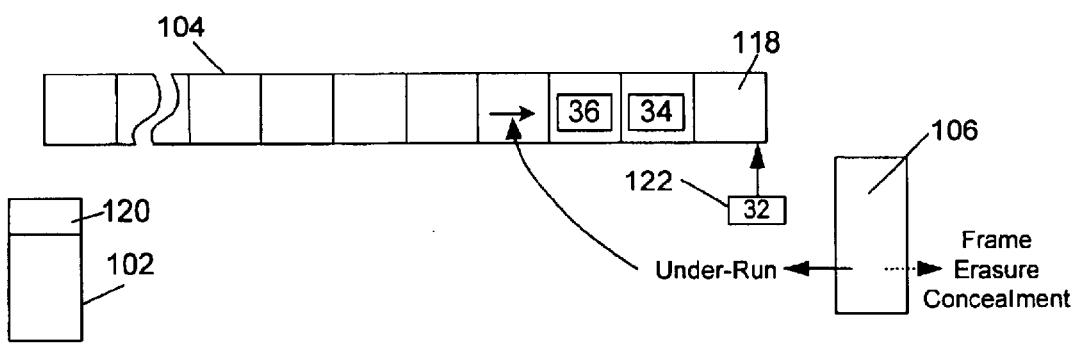

In FIG. 3*b*, the missing chunk has not arrived and the playout deadline has passed. The DSP 106, upon completing the playout of the chunk with timestamp 28 and removing it from storage, detects that storage is now empty. At this point the DSP 106 automatically (without explicit instruction from software outside of the DSP 106) invokes the frame erasure concealment policy appropriate to the configured voice encoding method. At the same time, it produces an indication, accessible to software associated with the JiB 104, that DSP 106 encoded speech storage was empty when data was required for playout (hereinafter referred to as an "under-run" condition). Upon receiving this under-run indication, the JiB 104 software moves all data in the JiB 104 one slot towards the head and adds the chunk interval to the head timestamp. This operation is similar to the process of moving the chunk in the head slot 118 to DSP storage, except that since the head slot 118 is empty, the move does not take place.

Figure 3C:
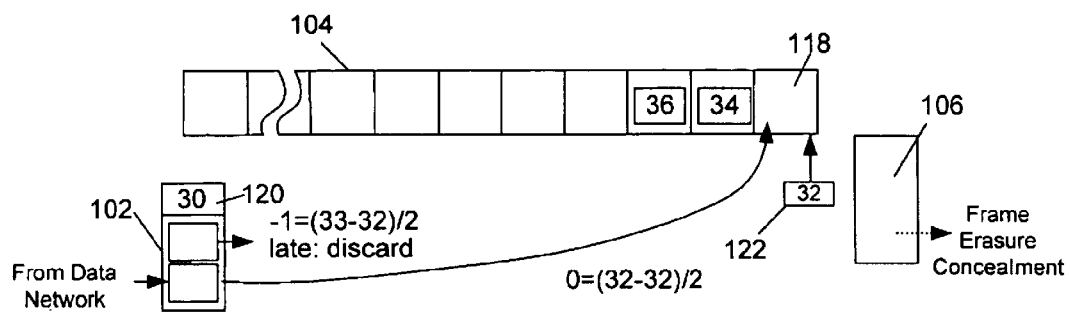

FIG. 3*c* illustrates the late arrival from the data network of the packet containing the missing chunk that created the hole shown in FIGS. 3*a* and 3*b*. The packet timestamp is 30, and since the head timestamp is now 32, the calculation of the slot in which the first chunk carried by the packet should be stored (as described herein) results in a negative number, in this case −1. The negative slot number indicates that the chunk has missed the corresponding playout deadline, and thus cannot be stored in the JiB 104. The DSP 106 has invoked frame erasure concealment to cover for the absence of this chunk at its playout deadline. The system 100 classifies the first chunk as "late" and discards it. The system 100 processes subsequent chunks of encoded speech data in the packet without regard to the discard of prior chunks. In the case shown in FIG. 3*c*, the timestamp of the second chunk will be computed as 32 and the calculation of the slot in which it should be stored results in zero, i.e. the head slot 118 of the JiB 104. The chunk will be moved to the head slot 118 in the normal manner. Thus, the arrival of a packet too late for playout of the first encoded speech data it contains does not result in the discard of all data from the packet. Any data that has not missed its playout deadline can be moved to the JiB 104 and processed normally.

Figure 3D:
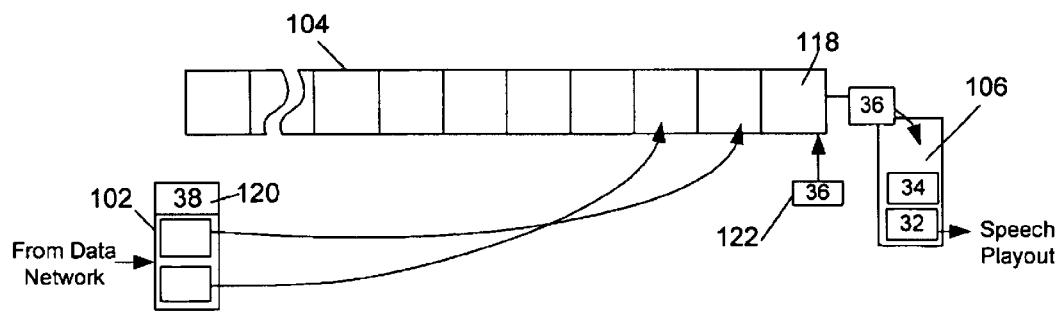

FIG. 3*d* shows the results of the arrival of the packet described via FIG. 3*c*. Having moved the chunk with timestamp 32 to the head slot 118, software associated with the JiB 104 can now begin moving data from the head to DSP storage. For the purposes of illustration, the chunks with timestamps 32 and 34 are shown moved to the DSP and the chunk with timestamp 36 is ready to be moved. The frame erasure concealment of the missing chunk has completed and speech playout has resumed using the encoded speech data in the chunk with timestamp 32. Packets arriving in the PUB 102 from the data network are continuously processed for storage in the JiB 104 as described herein. A packet with timestamp 38 is illustrated.

FIG. 4 illustrates the embodiment of the system 100 shown in FIGS. 1*a* through 1*d*, further establishing the average (arithmetic mean) time that encoded speech data will remain in storage, from receipt on the data network to decoding and playout when the apparatus initially enters continuous operation. The DSP 106 incorporates a playout clock 124 as a reference time base to control the playout of decoded speech data as audio. The playout clock 124 provides an indication of the progression of time as the playout occurs. The DSP 106 makes this playout clock 124 available to software associated with the JiB 104. The JiB 104 further incorporates a head playout time 126, which provides a static record of the time, according to the playout clock 124, that data in the head slot 118 of the JiB 104 reaches the decoder in the DSP 106 and begins playout. The playout clock 124 and head playout time 126 were omitted from earlier figures describing the system 100 for clarity.

Figure 4A:
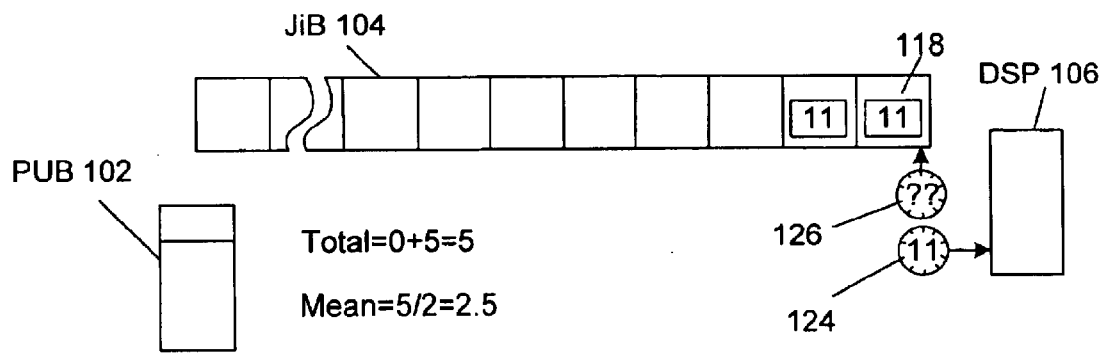
FIG. 4a illustrates the procedure for calculating the mean holding time of the data chunks stored within the jitter buffer in the embodiment of FIG. 1, prior to commencement of continuous operation of the system.

In FIG. 4*a*, two chunks have been stored in a previously empty JiB 104. This situation exists, for example, after the processing illustrated in FIG. 1*b* has completed. When the packet carrying these two chunks arrives from the data network, the DSP's playout clock 124 is shown with a value of 11 (this value has been chosen in this example for illustration purposes only). The playout clock 124 value of 11 is annotated on each of the two chunks, providing a record of the time at which each chunk arrived from the data network and entered JiB 104 storage (hereinafter "arrival time"). The calculation of the total holding time of the chunks in the JiB 104 proceeds as shown in the following example: when the system 100 moves the chunk in the head slot 118 to the DSP 106, decoding and playout commences immediately; therefore the holding time of this chunk is zero. The chunk in slot 1 is subsequently decoded and played out after the time taken to play out the chunk originally in the head slot 118 (during the mean holding time calculation, no chunks are actually moved; the above-described movement is only assumed to facilitate the calculation). The amount of time needed to play out the encoded speech data in each slot is referred to as the "slot playout time." For the purposes of illustration only, the slot playout time is presumed to be 5 playout clock units. In general, the units of playout time are related to the units of timestamp by a constant factor, although in some embodiments units of playout time and units of timestamp may be substantially equal. With one chunk having a holding time of zero, and a second chunk having a holding time of 5, the total holding time is 0+5=5 units. For this example,there are two chunks in the JiB 104, so the mean holding time is 5/2=2.5. The system 100 compares the calculated mean holding time value to a predetermined (and preferably externally configured) holding time goal. When the calculated mean holding time is equal to or greater than the holding time goal, the system 100 begins to move chunks from the JiB 104 to the DSP 106 for playout, as illustrated in FIG. 2. If the calculated mean holding time is less than the goal, the system 100 holds off playout until additional chunks arrive in packets from the data network. The system 100 preferably performs the mean holding time calculation, each time one or more chucks are added to the JiB 104.

Figure 4B:
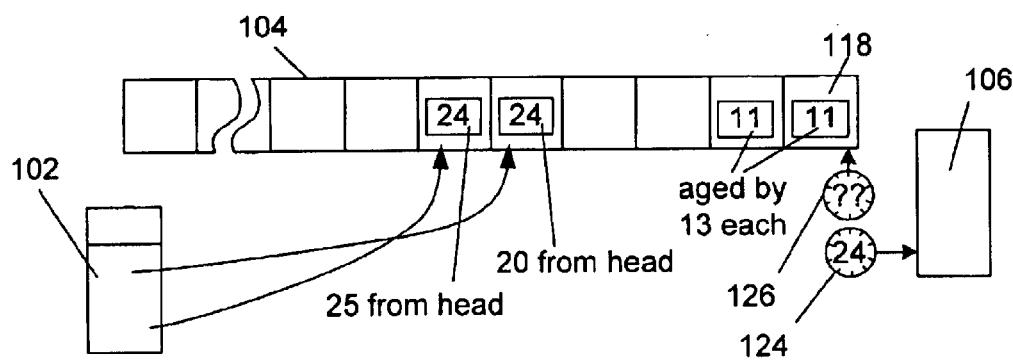

In FIG. 4b, a second packet has supplied two further chunks for storage in the JiB 104 in the manner first illustrated in FIG. 1c. The playout clock, in this example, advances to 24 units at the time the second packet arrives from the data network. The arrival times of the two new chunks are therefore 24. The calculation of the total holding time of the chunks in the JiB 104 proceeds as follows: two chunks were in the JiB 104, having a total calculated holding of 5 units when the playout clock read 11, prior to the arrival of the second packet. Since the playout clock now reads 24, both chunks have now remained in storage for an additional 24−11=13 units. The total holding time for the (two) chunks previously in the JiB 104 has therefore increased by 2×13= 26 units. This increase in total holding time of chunks already in storage is hereinafter referred to as the "aging term". The new total holding time of chunks already in storage is therefore 5+26=31 units. The system 100 places the first chunk from the second packet in slot 4 of the JiB 104. Since for this example, the chunk in each slot takes 5 units to play out, the chunk placed in slot 4 will take 4×5=20 units to reach playout (assuming that the chunk at the head slot 118 is played out immediately). This time to reach playout for a chunk newly entered into JiB 104 storage (assuming playout of the chunk in the head slot 118 begins immediately) is hereinafter referred to as the "chunk term". The chunk term of the chunk in slot 4 is 20 units. Similarly, the chunk term of the chunk in slot 5 is $$5 \times 5 = 25 \text{ units.}$$

The total holding time for all chunks, including the two newly entered, is $$31+20+25=76 \text{ units.}$$

Since there are now four chunks in the JiB 104, the calculated mean holding time is $$76/4=19 \text{ units.}$$

Thus, when the system 100 processes a new packet from the data network, the new total holding time is the sum of the previously computed total holding time, the aging term and the chunk terms of all chunks newly entered into JiB 104 storage. The mean holding time is the new total holding time divided by the new number of chunks in storage.

Figure 4C:
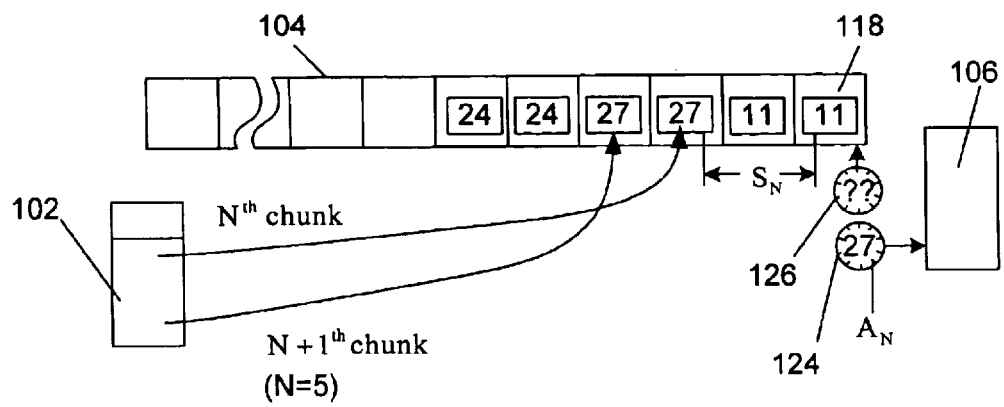
Figure 4D:
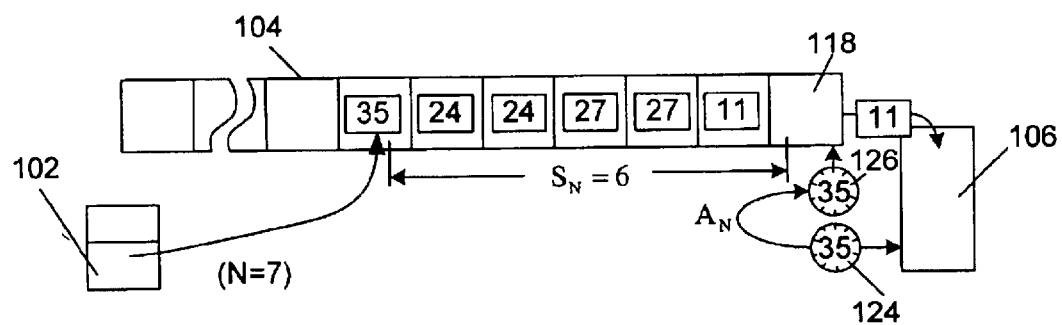

The preceding verbal description may be summarized by the following mathematical description. FIGS. 4c and 4d illustrate the arrival of another packet from the data network and the storage of its encoded speech data in the JiB 104. In this example, the first chunk in the new packet is designated as the $N^{th}$ chunk to be stored in the JiB 104. The arrival time of the chunk (i.e., the playout clock value at the time the packet arrives; see reference number 27 in FIG. 4c) is denoted by $A_N$. There are (N−1) chunks already in JiB 104 storage. The total holding time $T_{N-1}$ corresponding to these N−1) chunks was calculated at time $A_{N-1}$ when the N−1)$^{th}$ chunk arrived (see reference number 24 in FIG. 4b). In this example, the total holding time $T_{N-1}$ was calculated earlier for the four chunks in the JiB 104 to be 76 playout units. The aging term to be applied on the storage of the $N^{th}$ chunk (referred to herein as $E_N$) is given by:

$$E_N=(N-1) \times (A_N - A_{N-1})$$

For the particular values illustrated in FIG. 4c for the first chunk in the new packet, the aging term $E_5$ may be calculated as:

$$E_5=(5-1) \times (27-24)=4 \times 3=12 \text{ units}$$

The number of the slot in the JiB 104 in which the $N^{th}$ chunk is stored, calculated as described above and illustrated in FIG. 1, is denoted herein as $S_N$ (shown as 2 in FIG. 4c). The slot playout time (in playout time units) is denoted as P, and the chunk term for the $N^{th}$ chunk, denoted by the symbol $C_N$, is given by:

$$C_N = S_N \times P$$

For the particular values illustrated in FIG. 4c for the first chunk in the packet:

$$C_5=2 \times 5=10 \text{ playout units}$$

After the storage of this $N^{th}$ chunk, the total holding time $T_N$ for the N chunks now in the JiB 104 is:

$$T_N = T_{N-1} + E_N + C_N$$

For the particular values illustrated in FIG. 4c after the first chunk in the packet has been stored:

$$T_5 = 76+12+10 = 98 \text{ units}$$

The mean holding time when N chunks are stored in the JiB 104 is denoted by the symbol $H_N$, and is calculated as follows:

$$H_N = T_N/N$$

For the particular values illustrated in FIG. 4c after the first chunk in the packet has been stored (there are now 5 chunks in the JiB 104):

$$H_5 = 98/5 = 19.6 \text{ playout units}$$

Further illustrated by FIG. 4c, the $N+1^{th}$ chunk (from the new packet and therefore with the same arrival time as the $N^{th}$ chunk) is stored in slot 3 ($S_{N+1}=3$). It contributes a chunk term of $$C_{N+1} = S_{N+1} \times P = 3 \times 5 = 15 \text{ playout units,}$$

resulting in a total holding time 98+15=113 playout units and the mean holding time $$113/6=18.8 \text{ playout units.}$$

Since the $N+1^{th}$ chunk has the same arrival time as the previous chunk, the arrival times are equal, i.e., $A_{N+1}=A_N$, and the aging term is zero, i.e., $$E_{N+1} = N \times (A_{N+1} - A_N) = 5 \times 0 = 0.$$

Therefore, the complete calculation of aging term, chunk term, new total holding time and new mean holding time can be repeated for each chunk, regardless of whether chunks arrive in the same or different packets.

In FIG. 4d, a single chunk arrives in a packet as previously described in FIG. 1d. In this example, the playout clock indicates a value of 35 when the single chunk arrives, and the chunk is stored in slot 6. Using directly the above equations, where N is now 7 for this the $7^{th}$ chunk:

$$\text{aging term} = E_N = (N-1) \times (A_N - A_{N-1}\ 1) = 6 \times (35-27) = 48$$

chunk term=$C_N=S_N \times P=6 \times 5=30$ total holding time=$T_N=T_{N-1}+E_N+C_N=113+48+30=191$ mean holding time=$H_N=T_N/N=191/7=27.3$ Also for illustration purposes, let the externally configured holding time goal be 25 playout units in this example. This holding time goal has now been equaled or exceeded by the measured mean holding time $H_N$, therefore the process of moving data to the DSP for playout begins, as shown in FIG. 4c by the arrow from the head of the JiB 104 to the DSP 106. At this time, the value of the playout clock $A_N$ is copied to the head playout time as illustrated.

FIGS. 5a through 5d illustrate the embodiment of the system 100 shown in FIGS. 1a through 1d, further measuring the average (arithmetic mean) time that encoded speech data has spent in storage between receipt on the data network and decoding and playout when the apparatus has begun continuous operation. The apparatus is the same as that shown in FIGS. 4a through 4d.

Figure 5A:
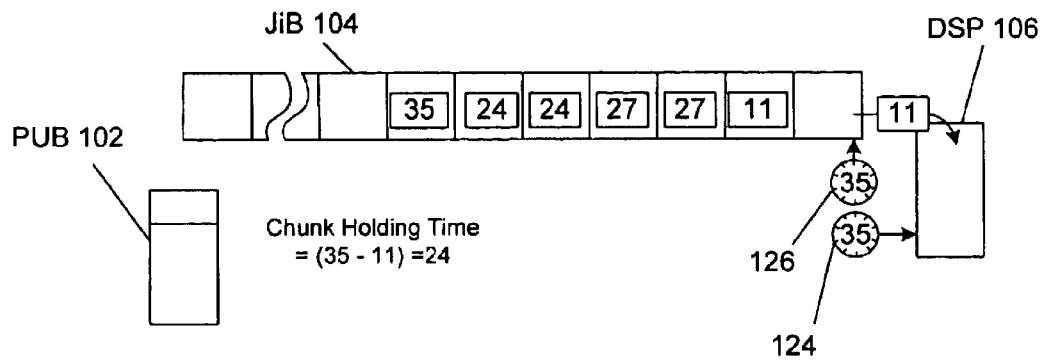
FIG. 5a illustrates the procedure for calculating the mean holding time of the data chunks stored within the jitter buffer in the embodiment of FIG. 1, during continuous operation of the system.

FIG. 5a shows the movement of the chunk from the head slot 118 of the JiB 104 to the DSP 106. FIG. 5a shows the state of the system 100 immediately following the state shown in FIG. 4d. The chunk from the head slot 118 is decoded and played out as audio to the receiving party immediately, since the DSP 106 has no prior data in storage and undergoing playout. The system 100 computes the difference between the head playout time 126 and the arrival time of the chunk; in this case 35−11=24. This computed difference represents the time that this chunk has spent in storage between arrival from the data network and the commencement of decoding and playout by the DSP 106 (hereinafter "chunk holding time"). After the chunk has been moved to the DSP 106 and its chunk holding time calculated, the head playout time 126 is increased by the slot playout time P, from 35 to 40 in this example.

Figure 5B:
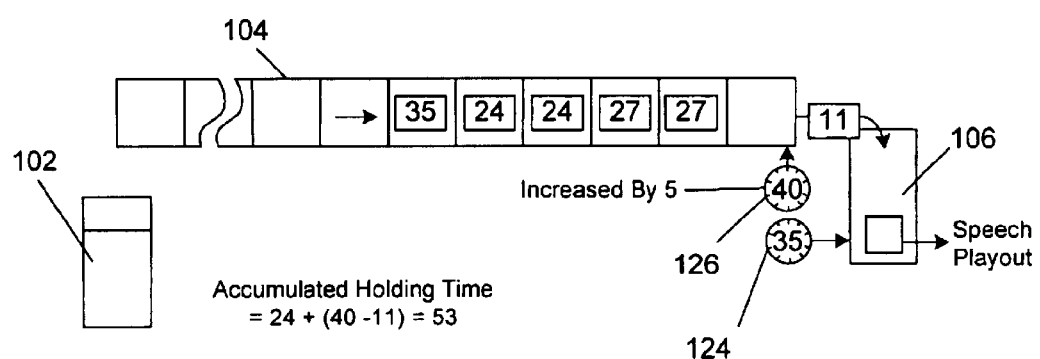

FIG. 5b illustrates the movement of the next chunk from the JiB 104 to the DSP 106. The system 100 calculates the holding time of this next chunk (as described herein) as 40−11=29. Once this next chunk is moved to the DSP 106, it is stored in the DSP 106 until the previous chunk has been played out, before this next chunk is decoded and played out. The increase of the head playout time 126, by the slot playout time P, accounts for the fact that the next chunk must wait until the previous chunk completes playout. Software associated with the JiB 104 accumulates successive chunk holding times. The total of the two chunks shown in FIG. 5a and FIG. 5b is 24+29=53.

Figure 5C:
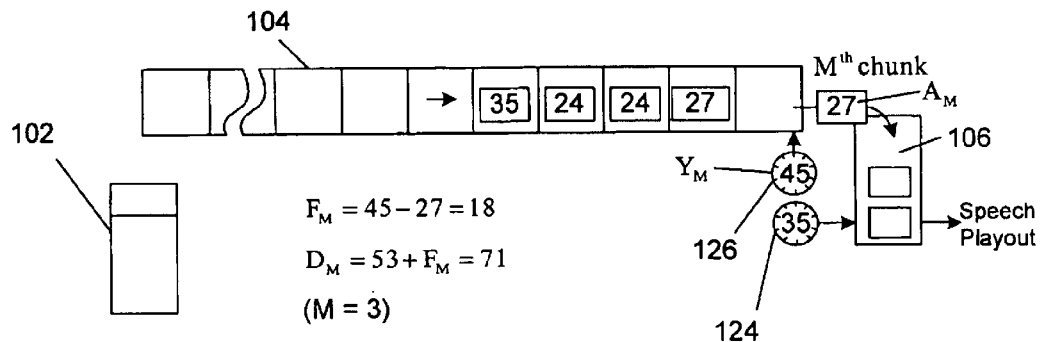

Consider the $M^{th}$ chunk moved to the DSP and the particular case illustrated by FIG. 5c in which it is the third chunk (i.e., M=3). The head playout time 126 at which this takes place is denoted herein by $Y_M$. As described herein, the head playout time 126 is initially copied from the playout clock 124, and after each chunk is moved it is increased by P as follows:

$Y_1$=copy of playout clock from DSP 106

$Y_M=Y_{M-1}+P$, for $M>1$

In the case under consideration, $Y_3=Y_2+P=40+5=45$. The $M^{th}$ chunk's arrival time is denoted herein by $A_M$. The arrival time $A_M$ read from the chunk is the same as the arrival time $A_N$ stored with the chunk upon transfer from the PUB 102, but the sequence M of chunks moved from JiB 104 storage differs from the sequence N of chunks stored due to re-ordering. The chunk holding time is denoted herein by FM, and is calculated (as described herein) as:

$F_M=Y_M-A_M$

In the case under consideration, $F_3=Y_3-A_3=45-27=18$. The sum of successive chunk holding times (hereinafter "accumulated holding time") after the movement of M chunks to the DSP 106 is denoted herein by $D_M$. The accumulated holding time is calculated by summing successive chunk holding times as follows:

$D_M=D_{M-1}+F_M$

In the case under consideration, $D_3=D_2+F_3=53+18=71$.

When the fourth chunk is moved to the DSP, the head playout time 126 is calculated as:

$Y_4=Y_3+P=45+5=50$, the chunk holding time is calculated as:

$F_4=Y_4-A_4=50-27=23$, and the accumulated holding time is calculated as:

$D_4=D_3+F_4=71+23=94$.

Similarly, when the fifth chunk is moved to the DSP, the head playout time 126, the chunk holding time, and the accumulated holding time are calculated as:

$Y_5=Y_4+P=50+5=55$, $F_5=Y_5-A_5=55-24=31$, and, $D_5=D_4+F_5=94+31=125$, respectively.

When the sixth chunk is moved to the DSP 106, the head playout time 126, the chunk holding time, and the accumulated holding time are calculated as:

$Y_6=Y_5+P=55+5=60$, $F_6=Y_6-A_6 60-24=36$ and $D_6=D_5+F_6=125+36=161$.

Figure 5D:
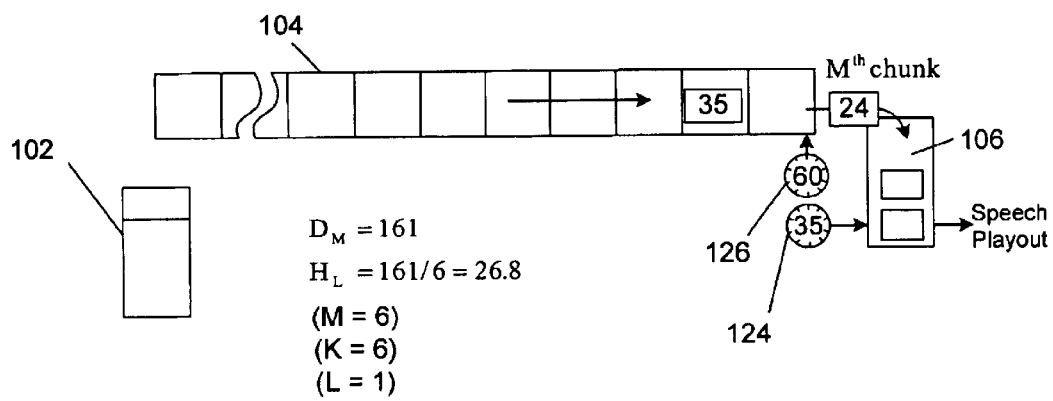

The state of the system 100 at the time the sixth chunk is moved to the DSP 100 is illustrated by FIG. 5d. The purpose of computing the accumulated holding time $D_M$ by summing chunk holding times $F_M$ is to produce a periodic measurement of the mean holding time of data leaving the JiB 104. The period of these measurements is a multiple of the slot playout time P, denoted herein by K. In this example, the multiple is K=6. In FIG. 5d, then, 6 chunk holding times have been summed in the accumulated holding time value of $D_6=161$. The mean holding time $H_L$ is calculated every K chunks by dividing $D_M$ by K as follows:

$H_L=D_M/K$, when $M=K \times L$,

Where L is an indexing integer that describes a particular set of K chunk holding times. In this example, $H_1=D_6/6=161/6=26.8$. The system 100 compares this value of mean holding time to the holding time goal, which for illustration purposes was chosen above to be 25, to adjust, as described below, the measured mean holding time of future chunks to be closer to the goal. After computing the mean holding time over K slot playout times, the system 100 resets the value of the accumulated holding time $D_M$ to zero. Further chunks, as they move to the DSP, thus contribute their chunk holding times to the calculation of a new accumulated holding time. At each interval of K playout times, the system 100 calculates a new mean holding time $H_L$ from the new accumulated holding time, and then resets the holding time accumulator for the next set of K chunk holding times. The calculation of $D_M$ is therefore more properly:

$D_M = F_M$, when $(M \bmod K) = 1$, and $D_M = D_{M-1} + F_M$, when $(M \bmod K) \neq 1$, so that:

$H_L = \{F_{M-(K-1)} + F_{M-(K-2)} + \ldots + F_{M-1} - F_M\}/K$, when $M = K \times L$.

This process of periodically calculating the mean of a continuous series of values may be termed "accumulate-and-dump" averaging. The interval of these calculations in real time may usefully be chosen to be approximately constant, irrespective of the slot playout time P, by suitable selection of the accumulation multiple K.

Figure 6:
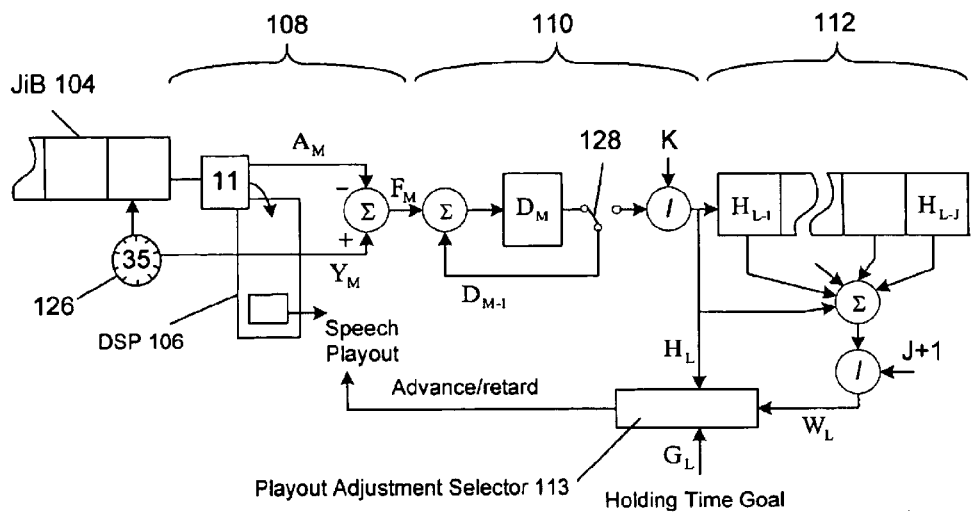
FIG. 6 illustrates the complete means by which the average storage time of encoded speech data between arrival from the data network and decoding and playout to the receiving party is measured and adjusted towards a goal value.

FIG. 6 illustrates a more detailed description of the embodiment shown in FIG. 1, including the complete means by which the mean holding time $H_L$ is measured and adjusted towards a predetermined goal value. In particular, FIG. 6 describes the components of the system 100 following the JiB 104 as a signal flow diagram, including the chunk holding time calculator 108, the mean holding time calculator 110, the smoothed mean holding time calculator 112, and the playout adjustment selector 113. As described herein with reference to FIG. 5a, the chunk holding time calculator 108 combines the chunk arrival time $A_M$ and the corresponding head playout time $Y_M$ to produce the chunk holding time $F_M$. The mean holding time calculator 110 performs a periodic calculation of a mean holding time by accumulate-and-dump as described herein with reference to FIGS. 5a through 5d. In the exemplary embodiment shown in FIG. 6, a switch 128 operates every K chunks to reset the accumulation of $D_M$ and output a value $H_L$. Alternate embodiments may employ other methods known to those in the art to perform the accumulator reset function of the switch 128. The smoothed mean holding time calculator 112 stores and averages a predetermined number of consecutive values of the mean holding time $H_L$, using a "sliding window" technique as shown in FIG. 6. The sliding window averaging technique is an alternate to the accumulate-and-dump averaging technique described herein. The sliding window shown in FIG. 6 smooths out fluctuations in the holding time measurement caused by the stochastic nature of the arrival times of individual packets from the data network. The smoothed mean holding time calculator 112 sums each new value of the mean holding time $H_L$ from the mean holding time calculator 110 with the preceding J values of $H_L$. The smoothed mean holding time calculator 112 divides the resulting sum by J+1 to produce the smoothed mean holding time $W_L$. When a new value of mean holding time $H_L$ is available, the smoothed mean holding time calculator 112 discards the oldest value $H_{L-J}$ from storage and replaces it with the new value $H_L$. The width of the averaging window J is selected so as to provide for the desired smoothing effect. Larger values of J provide a greater smoothing effect on variations in the measured mean holding time, but cause $W_L$ to respond more slowly to changes in the data network delay. Smaller values of J provide less smoothing but result in a faster response to changes in the data network delay. The use of accumulate-and-dump averaging of measured chunk holding times in the first stage and sliding window in the second stage provides good smoothing with low storage use, and the outputs from both stages occur at the same frequency. Other implementations are possible. When the measurement of mean holding time $H_N$ (as described herein with reference to FIG. 4) equals or exceeds the predetermined mean holding time goal, the movement of data to the DSP 106 for playout begins. Initially, when the first value of $H_L$ is available to the smoothed mean holding time calculator 112, no history of previous $H_L$ values exists, i.e., the other J locations in the sliding window are empty. Therefore, no meaningful average can be performed. To solve this start up problem, the system 100 artificially sets the empty locations in the sliding window to the same value as the first available $H_L$. Doing so ensures that when the first smoothed value $W_1$ is calculated and no history of $H_L$ values exists, the output is reasonable.

A playout adjustment selector 113 receives both the un-smoothed $H_L$, and smoothed $W_L$, measured mean holding time values. The playout adjustment selector 113 also receives the predetermined holding time goal, which initially is externally configured, but is subsequently adapted as described herein. The playout adjustment selector provides commands to the DSP 106 to adjust the playout timing. A command to advance playout timing causes the DSP 106 to discard decoded audio data, accept new data from the JiB 104 earlier than without the adjustment, and therefore reduce the time for which data is stored before playout. A command to retard playout timing causes the DSP 106 to add some made-up audio data, delaying the acceptance of new data from the JiB 104 and therefore increasing the time for which data is stored before playout. In one preferred embodiment, the time period to be removed from playout by an advance command or added to playout by a retard command may be fixed by software associated with the DSP 106. In alternate embodiments, the aforementioned time period may be selectable by the playout adjustment selector 113. The time period may usefully be smaller than the slot playout time, so as to effect fine-grained adjustment of holding time in preference to discarding or inserting complete data chunks, which would otherwise be necessary. The system 100 compares the un-smoothed mean holding time $H_L$ with the predetermined goal. If the comparison results in a significant difference, i.e., if the difference exceeds a predetermined threshold, a sudden change in data network delay is indicated, and a playout adjustment is in order. $H_L$ being larger than the predetermined goal indicates the need for an advance, and $H_L$ being smaller than the goal indicates the need for a retard, as described herein. The size of the adjustment may be the full difference, or some portion of the full difference, to slow the response to temporary changes. In the absence of a sudden change in delay, detected as described herein, the system 100 compares the smoothed mean holding time $W_L$ to the goal. Smaller differences are accepted as indicative of an adjustment, so as to closely track gradual changes in data network delay. The sense (i.e., direction) of the adjustment is as described herein. Again, the size of an adjustment may be the full difference or some portion of it, the latter being recommended. If an adjustment is performed, the mean holding time values $H_L$, $W_L$, and the J stored previous values of $H_L$ in the smoothed mean holding time calculator 112 are adjusted by the same time and in the same direction, so as to presage the change in holding time. Doing so avoids the adjustment decision being repeated until its full effect appears in computed mean holding times, and allows the adaption of the holding time goal to use the best available measurement for the mean holding time of data still in JiB 104 storage.

Figure 7:
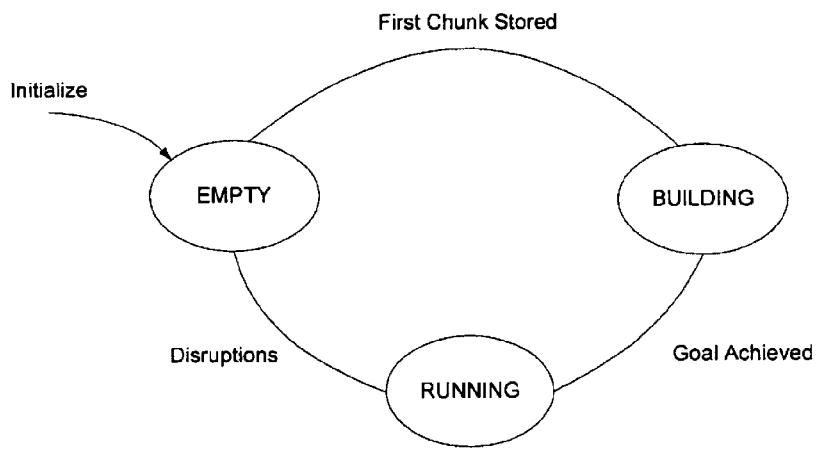
FIG. 7 illustrates the states which sequence the apparatus through the process of establishing and maintaining a suitable storage time for encoded speech data.

FIG. 7 illustrates the states through which the system 100, and in particular, the JiB 104, sequences as it establishes and maintains a suitable storage time for encoded speech data. The initial state of the JiB 104 for a new connection is EMPTY. When the first chunk of data from a packet on the data network is stored in the JiB 104, the state becomes BUILDING. The calculation of mean holding time described herein (with reference to FIGS. 4a through 4d), takes place in the BUILDING state, during which state data is not moved from the JiB 104 to the DSP for playout. When the mean holding time of data in JiB 104 storage equals or exceeds the holding time goal (as described herein with reference to FIG. 4d), the state transitions to RUNNING. Data is moved from the JiB 104 to the DSP for decoding and playout while in the RUNNING state, and the mean holding time is now calculated (as described herein with reference to FIG. 5a through 5d). Further, the mean holding time is adjusted (as described herein with reference to FIG. 6), and the mean holding time goal is adapted (as described herein with reference to FIG. 8), while in the RUNNING state. The JiB 104 may return to the EMPTY state in response to certain extraordinary conditions, including, but not limited to: a) a large proportion of either early or late chunks, indicating a gross change in data network delay, b) a long period of no received packets, such that the tracking of the sender's data transmission rate may be expected to have drifted away from the optimal area, and c) internal operation of the apparatus has been disrupted, for example by network management commands to restart, use the DSP for tone signaling, etc.

Figure 8:
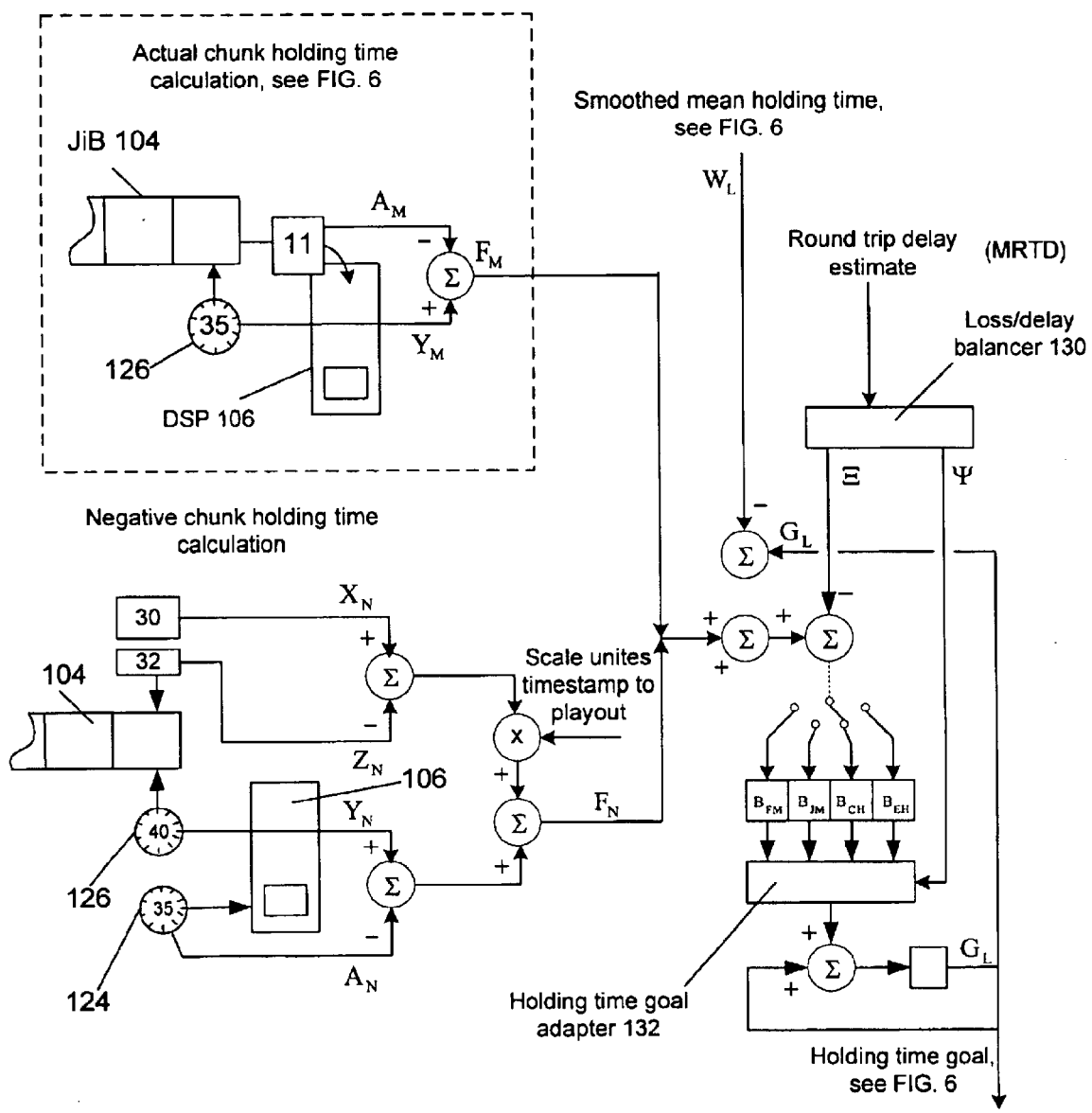
FIG. 8 illustrates the means by which the goal value for the holding time is adapted to balance the additional round-trip delay caused by the storage of encoded speech data with the loss of speech data that arrives after it is required to begin playout.

FIG. 8 illustrates the means by which the system 100 described in FIG. 1 may vary (adapt) the holding time goal to balance additional round-trip delay caused by the storage of encoded speech data as described herein, and the loss of speech data due to arrival after its playout deadline. If chunks arrive equally spaced in time (as they were generated by the transmitter), the chunks can be stored in the head of the JiB 104 and immediately played out. No encoded speech data will be lost and little delay will be added by storage in the JiB 104. The variation of transit time over the data network requires chunks to be held in storage, so that chunks experiencing a smaller delay can be held for longer than those experiencing a larger delay, thus compensating for delay variation and providing smooth playout. The system 100 may adjust the holding time goal such that chunks experiencing the longest delay on the data network are held for a very short time before playout. No data would then be lost due to arrival after its playout deadline. The statistical characteristics of the data network transit delay cannot, however, be known by the system 100 as it depends on so many factors, such as traffic load from unrelated sources. Also, a large holding time is to be avoided since it will increase round-trip delay and disturb the natural conversation between communicating parties. The present invention maintains a holding time goal so as to achieve an optimal balance between the amount of data lost and the overall round-trip delay. The system 100 introduces a holding time goal that maximizes the number of packets that arrive in time for playout, while minimizing the total round-trip network delay. Thus, the system 100 will tolerate some loss of speech data due to late arrival, in order to keep the round-trip delay within acceptable limits.

An estimate of the mean round-trip transit delay (hereinafter referred to as MRTD) over the data network between communicating parties is preferably supplied to the system 100 from an external source. The MRTD can be determined by such methods as operator configuration, use of the Real-Time Transport Control Protocol (hereinafter "RTCP") or other methods known to those in the art. Two parameters which control the adaptation of the holding time goal, "loss tolerance," denoted herein by $\Psi$, and "extra margin," denoted herein by $\Xi$, are computed from the MRTD value by the loss/delay balancer 130. The loss tolerance $\Psi$ expresses the proportion of encoded speech data that may be allowed to arrive late before increasing holding time. The extra margin $\Xi$ expresses a bias to the arrival margin intended to increase holding time and offer additional protection against late arrival. For a long round-trip network transit delay, it is desirable to avoid additional delay, so the system 100 establishes a non-zero loss tolerance $\Psi$ to allow a certain amount of late arrival without increasing holding time. For a moderate round-trip transit delay, the system 100 establishes a small or zero loss tolerance $\Psi$, which causes the system 100 to increase the holding time goal whenever late arrival of data, in excess of $\Psi$, occurs. For a small round-trip transit delay, the system establishes a loss tolerance $\Psi$ of zero, and a non-zero extra margin $\Xi$ may be set. A non-zero extra margin $\Xi$ causes an increase in the holding time goal when chunks arrive with only a small arrival margin, regardless of whether the chunks arrive late. Doing so offers protection against loss of data in occasional packets experiencing more-than-normal transit delay.

The calculation of the chunk holding time, $F_M$, has been described above with reference to FIG. 5a, where it was used to measure the mean holding time of the flow of data from the JiB 104 to playout in the DSP. Software associated with the JiB 104 also uses the chunk holding time to compute the "arrival margin", which is the time margin by which the chunk arrives before the associated playout deadline. To facilitate this, the system 100 must calculate a negative chunk holding time for chunks that arrive late for playout and are not stored, as follows:

$$F_N = Y_N - A_N + (X_N' - Z_N')$$

where the N suffix indicates values at the time that chunks are removed from packets arriving from the data network, but symbols otherwise have their previously defined meanings. The calculation is the familiar difference of head playout time 126 and arrival time, which will in this situation be negative, but the additional negative term of by how far the chunk missed storage in the JiB 104 is included. This calculation uses the difference between the chunk timestamp $X_N$, and the head timestamp $Z_N$, in the same way that the JiB 104 slot is found. However, since $X_N < Z_N$ for a late chunk, the result of the calculation is negative (i.e., a negative chunk holding time) and thus contributes to chunk lateness. The prime marks (i.e., ') on $X_N'$ and $Z_N'$ indicate that their corresponding values may require conversion from timestamp units to playout time units if these differ. For example, timestamps may be measured in units of 125 $\mu$s and playout time in units of 1 ms, in which case $X_N$ and $Z_N$, or their difference, must be divided by 8.

The arrival margin for the $M^{th}$ chunk, denoted by $R_M$, is computed as:

$$R_M = F_M + (G_L - W_L) - \Xi$$

where $G_L$ is the current value of the predetermined holding time goal and the other symbols have the previously defined meanings ($F_M$ and $F_N$ are used identically). The chunk is then classified according to whether, according to this arrival margin, it arrived in time for playout or was late and, in either case, by how much. Note that because the arrival margin takes into account the difference between the measured mean holding time and the holding time goal and is further offset by the extra margin, the classification may differ from the actual arrival relative to playout. The system 100 classifies the chunk by examining the sign and value of the margin $R_M$. A count of the chunks that were classified in each category is kept in "bins." One preferred embodiment of the invention utilizes four bins, $B_{FM}$ (far miss bin), $B_{JM}$ (Oust miss bin), $B_{CH}$ (close hit bin), and $B_{EH}$ (easy hit bit), but alternate embodiments of the invention may utilize other numbers of bins having different designations. Each bin (other that the bins representing the most positive and most negative margins) delineates a range of margin values, hereinafter referred to as the "bin width," and denoted by $\Delta$. If the chunk misses storage by more than the bin width $\Delta$ (i.e., $R_M < -\Delta$), the chunk is classified as a "far miss," and the value in bin $B_{FM}$ is increased by one. If the chunk misses storage by less than the bin width $\Delta$ (i.e., $-\Delta \leq R_M < 0$), the chunk is classified as a "just miss," and $B_{JM}$ is increased by one. If the chunk achieves storage in the JiB 104 by less than the bin width $\Delta$ (i.e., $0 \leq R_M < \Delta$), it is classified as a "close hit," and $B_{CH}$ is increased by one. If the chunk achieves storage by the bin width $\Delta$ or more (i.e., $\Delta \leq R_M$), it is classified as a "easy hit," and $B_{EH}$ is increased by one. When a predetermined number of chunks have been stored in the JiB 104, and their associated margins have been classified with respect to the various bins, all bin values are normalized to percentages of the total number of chunks classified. The holding time goal adapter 132 evaluates the normalized bin values to determine adjustments to the holding time goal, as described herein. The bins are then reset to zero, the system proceeds to classify further data chunks, and the cycle repeats each time the aforementioned predetermined number of chunks are classified.

If $B_{FM}$ is greater than zero, that is, some chunks substantially missed storage in the JiB 104 having a large negative margin, then the system 100 increases the holding time goal by an amount intended to correct for excess loss. The excess loss, i.e., the loss by late arrival that should be eliminated by the goal increase, is calculated as:

$$\text{excess loss} = B_{JM} + B_{FM} - \Psi$$

and the arrival density, the mean number of chunks falling into bins of width $\Delta$, is calculated as:

$$\text{arrival density} = (B_{CH} + B_{JM})/(2 \times \Delta)$$

so that the increase to the holding time goal is:

$$G_L + 1 = G_L + (\text{excess loss/arrival density}) = G_L + \{2 \times \Delta \times (B_{JM} + B_{FM} - \Psi) / (B_{CH} + B_{JM})\}$$

If $B_{FM}$ is zero but $B_{JM}$ is greater than zero, that is, some chunks missed storage in the JiB 104, but all had only a small negative margin, then the same method as described above is used to compute an increase to the holding time goal. However, since all late chunks missed only by one bin width A, an increase of this amount could be expected to eliminate all loss. Therefore, if the above calculation gives an increase greater than $\Delta$, it is reduced to this amount so that maximum value of $G_{L+1}$ is $G_L - \Delta$.

If $B_{JM}$ is zero but $B_{CH}$ is greater than zero, that is, all chunks achieved storage in the JiB 104 but some had only a small positive margin, then a decrease to the holding time goal can be contemplated. If the proportion of close hits is less than or equal to the loss tolerance ($B_{CH} \leq \Psi$), the goal may be increased by a complete bin width:

$$G_{L+1} = G_L - \Delta$$

Otherwise, if the loss tolerance is greater than zero, a smaller adjustment may be made:

$$G_{L+1} = G_L - \{\Delta \times (\Psi / B_{CH})\}$$

If neither of the above conditions are true, the goal is unchanged.

If $B_{CH}$ is zero, then all chunks achieved storage in the JiB 104 by a large positive margin and a somewhat arbitrary decrease of the holding time goal is made:

$$G_{L+1} = G_L - \Delta/2 - \Psi$$

This will reduce the delay caused by chunk storage before playout without substantial risk of loss of encoded speech data since at the current settings the arrival margin is always significantly positive.

Note that since the value of the holding time goal $G_L$ is included in the calculation of the arrival margin $R_M$, a change to the goal will immediately be reflected in computed margins for new chunks stored in the JiB 104. The delay in the actual holding time converging on a new goal therefore does not cause adjustments to the goal to be repeated based on old measurements.

The holding time goal may be restricted to upper and lower limits set by external configuration.

The description above, with reference to FIG. 1, of the storage of encoded speech assumed that chunks identified by the PUB 102 in packets received from the data network would be stored in individual slots in the JiB 104. That is to say, the calculation of the slot:

$$S_N = (X_N - Z_N)/V$$

yields an integer result without remainder. This will be true when the speech encoding is of a type generally know as source, block or frame-based encoding. Encoded speech data is emitted by the transmitter in frames of well-defined sizes which correspond to a well-defined time period. Only whole frames are transmitted in packets, each frame is easily separated from the rest of the packet and each frame is stored in precisely one slot in the JiB 104. The chunk interval, V, is the well-defined time period to which a frame corresponds, converted to timestamp units and the slot playout time, P, is this same time converted to playout time units. However, another type of speech encoding, generally know as sample—or waveform-based, may be used. In such cases, the transmitter emits encoded speech data as a continuous stream of samples which, in effect, describe the analog waveform of the input speech signal. The size of each sample may be from 2 to 8 bits. Any number of samples that corresponds to a whole number of octets may be transmitted over the data network in each packet. For the sake of efficiency, the DSP may not receive into storage for playout an arbitrary number of samples but may, instead, require some fixed or configurable number of samples to be moved into storage as a unit. The JiB 104 slots can then be usefully dimensioned to hold such a unit. The term "chunk" has been used to refer to a frame when the first type of encoding (frame-based) is used and this unit described above when the second type of encoding (waveform-based) is used.

The problem now arises that the data received in packets will have no fixed alignment with respect to slot boundaries. To solve this, slots are pre-filled with samples that represent a zero analog signal and data from packets is allowed to part-fill slots. This zero-fill must occur when the JiB 104 is first initialized or subsequently returns to the EMPTY state. In addition, as chunks are moved to the DSP and slots are re-used to store new samples from the data network, these slots must be zero-filled. The calculation of the slot from the timestamps is supplemented with a calculation of the offset into the slot at which data storage should begin. The size of the chunk first removed from a packet is chosen so that a slot is filled to the end and the next chunk aligns exactly to the start of the next slot. At the end of a packet, a slot may be part filled. If all transmitted packets arrive and none miss their playout deadline, all slots will contain the right amount of encoded speech data to pass complete chunks to the DSP. If packets have been dropped by the data network or arrive late, some chunks may contain zero-fill that has not been overwritten by encoded speech data. The use of zero-fill minimizes the affect on playout speech quality. The chunk interval, V, in timestamp units and the slot playout time, P, in playout time units, are chosen based on the time represented by the amount of data passed as a unit to the DSP. These values, and not the extent of physical storage allocated for a slot, are used to define the end of a slot for the purposes of filling it with samples.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. For a plurality of digital data chunks sequentially generated by a data transmitter according to a natural temporal order and a natural time alignment, and thereupon transmitted across a digital data network to a receiver, such that said digital data chunks arrive at said receiver in a received temporal order substantially independent of said natural temporal order and in a received time alignment substantially independent of said natural time alignment, a system for re-sequencing said plurality of digital data chunks at said receiver so as to transform said received temporal order into said natural temporal order, comprising:
    a chunk sorter for storing said digital data chunks in a data buffer and thereafter sequentially transferring, in said natural temporal order and at a chunk transfer rate compatible with a playout rate, said digital data chunks to a playout destination according to said natural temporal order, wherein said chunk sorter further includes:
        (i) a packet unassembly buffer for receiving a plurality of packets of said digital data chunks;
        (ii) a jitter buffer having a plurality of storage slots for storing said data chunks, wherein said chunk sorter zero-fills said storage slots so as to accommodate data chunks having a data width less than a width of said storage slots; and,
        (iii) a digital signal processor for receiving said data chunks from said jitter buffer and sequentially playing out said data chunks in said natural temporal order at said playout rate; and
    a chunk sequence analyzer for measuring an average time that said digital data chunks remain in said data buffer prior to playout, and for adjusting said playout rate so as to balance (a) an increase in said average time, with (b) an amount of data chunks lost due to arriving late and missing a playout deadline.

2. For a plurality of digital data chunks sequentially generated by a data transmitter according to a natural temporal order and a natural time alignment, and thereupon transmitted across a digital data network to a receiver, such that said digital data chunks arrive at said receiver in a received temporal order substantially independent of said natural temporal order and in a received time alignment substantially independent of said natural time alignment, a system for re-sequencing said plurality of digital data chunks at said receiver so as to transform said received temporal order into said natural temporal order, comprising:
    a chunk sorter for storing said digital data chunks in a data buffer and thereafter sequentially transferring at a chunk transfer rate compatible with a playout rate, said digital data chunks to a playout destination according to said natural temporal order, and,
    a chunk sequence analyzer for measuring an average time that said digital data chunks remain in said data buffer prior to playout, and for adjusting said playout rate so as to balance (a) an increase in said average time, with (b) an amount of data chunks lost due to arriving late and missing a playout deadline, wherein said chunk sequence analyzer further includes
        (i) a chunk holding time calculator for determining a chunk holding time for each of said data chunks in said data buffer;
        (ii) a mean holding time calculator for receiving said chunk holding time corresponding to each of said data chunks, and averaging a predetermined number of said chunk holding times, so as to produce a mean holding time corresponding to a set of data chunks in said data buffer;
        (iii) a smoothed mean holding time calculator for receiving said mean holding time corresponding to each of said sets of data chunks in said data buffer, and averaging a predetermined number of said mean holding times within a time window, so as to produce a smoothed mean holding time.

3. A system according to claim 2, wherein said holding time calculator calculates a total holding time $T_N$ for N data chunks in said data buffer at a time that an $N^{th}$ data chunk is stored in said data buffer, said total holding time $T_N$ including a sum of a next preceding total holding time $T_{N-1}$, an aging term $E_N$, and a chunk holding term $C_N$.

4. A system according to claim 2, wherein said mean holding time calculator calculates a mean holding time $H_N$ for N data chunks in said data buffer at a time that an $N^{th}$ data chunk is stored in said data buffer, said mean holding time $H_N$ including a product of said total holding time $T_N$ and 1/N.

5. A system according to claim 4, wherein said chunk sorter initiates a transfer of said data chunks in said data buffer to said playout destination when said mean holding time $H_N$ equals or exceeds a predetermined holding time goal.

6. A system according to claim 2, wherein said chunk sequence analyzer further associates an arrival time with each of said data chunks according to a playout clock associated with said playout destination.

7. A system according to claim 2, wherein upon playout of said data chunks, said holding time calculator calculates, for each of said data chunks, a chunk holding time being a difference between a head playout time and an arrival time of said data chunk.

8. A system according to claim 7, wherein said mean holding time calculator calculates, for a set of K data chunks, a mean holding time being a product of (a) a sum of K chunk holding times corresponding to said set of K data chunks, and (b) 1/K.

9. A system according to claim 8, wherein said sum of K chunk holding times includes K consecutive chunk holding times.

10. A system according to claim 8, wherein said smoothed mean holding time, calculator calculates, for a set of J mean holding times, a smoothed mean holding time being a product of (a) a sum of J mean holding times and (b) 1/J.

11. A system according to claim 10, wherein said sum of J mean holding times includes J consecutive mean holding times.

12. A system according to claim 2, further including a playout adjustment selector for receiving said mean holding time, said smoothed mean holding time and a holding time goal, and providing a playout adjustment signal to said playout destination for adjusting said playout rate, said playout adjustment signal being a predetermined function of said mean holding time, said smoothed mean holding time and said holding time goal.

13. A system according to claim 12, wherein said predetermined function includes comparing said mean holding time to said holding time goal, providing an advance playout command via said adjustment signal if said mean holding time is larger than said holding time goal, and providing a retard playout command via said adjustment signal if said mean holding time is smaller than said holding time goal.

14. A system according to claim 12, wherein said predetermined function includes comparing said smoothed mean holding time to said holding time goal, providing an advance playout command via said adjustment signal if said smoothed mean holding time is larger than said holding time goal, and providing a retard playout command via said adjustment signal if said smoothed mean holding time is smaller than said holding time goal.

15. A system according to claim 12, wherein said predetermined function includes comparing said mean holding time to said holding time goal so as to produce a comparison value, and providing said adjustment signal such that an adjustment magnitude corresponds to said comparison value.

16. A system according to claim 2, said chunk sequence analyzer further including a holding time goal adapter for adjusting a chunk holding time goal, wherein said holding time goal adapter:
  (i) determines, for each data chunk, an arrival margin by which said data chunk either (a) achieves storage in said data buffer prior to playout, or (b) does not achieve storage in said data buffer due to missing said playout deadline;
  (ii) sorts said arrival margins into a predetermined set of arrival margin bins; and,
  (iii) adjusts said chunk holding time goal as a predetermined function of said sorted arrival margins.

17. A system according to claim 16, wherein said arrival margin is a predetermined function of an associated chunk holding time, an associated smoothed mean holding time, and a previous holding time goal value.

18. A system according to claim 16, wherein said chunk holding time goal is further a predetermined function of a loss tolerance value and a margin value width of said arrival margin bins.

19. For a plurality of digital data chunks sequentially generated by a data transmitter according to a natural temporal order, and thereupon transmitted across a digital data network to a receiver, such that said digital data chunks arrive at said receiver in a received temporal order substantially independent of said natural temporal order, a method of re-sequencing said plurality of digital data chunks at said receiver so as to transform said received temporal order into said natural temporal order, comprising the steps of:
  storing said digital data chunks in a data buffer and thereafter sequentially transferring, at a chunk transfer rate compatible with a playout rate, said digital data chunks to a playout destination according to said natural temporal order; including the steps of:
    (i) receiving a plurality of packets of said digital data chunks in a packet unassembly buffer;
    (ii) storing said data chunks in a jitter buffer having a plurality of storage slots; and,
    (iii) receiving said data chunks from said jitter buffer and sequentially playing out said data chunks in said natural temporal order at said playout rate;
    (iv) zero-filling said storage slots so as to accommodate data chunks having a data width less than a width of said storage slots, and,
  measuring an average time that said digital data chunks remain in said data buffer prior to playout, and adjusting said playout rate so as to balance (a) an increase in said average time, with (b) an amount of data chunks lost due to arriving late and missing a playout deadline.

20. For a plurality of digital data chunks sequentially generated by a data transmitter according to a natural temporal order, and thereupon transmitted across a digital data network to a receiver, such that said digital data chunks arrive at said receiver in a received temporal order substantially independent of said natural temporal order, a method of re-sequencing said plurality of digital data chunks at said receiver so as to transform said received temporal order into said natural temporal order, comprising the steps of:
  storing said digital data chunks in a data buffer and thereafter sequentially transferring, at a chunk transfer rate compatible with a playout rate, said digital data chunks to a playout destination according to said natural temporal order; and,
  measuring an average time that said digital data chunks remain in said data buffer prior to playout, and adjusting said playout rate so as to balance (a) an increase in said average time, with (b) an amount of data chunks lost due to arriving late and missing a playout deadline, further including the steps of:
    (i) determining a chunk holding time for each of said data chunks in said data buffer;
    (ii) receiving said chunk holding time corresponding to each of said data chunks, and averaging a predetermined number of said chunk holding times, so as to produce a mean holding time corresponding to a set of data chunks in said data buffer;
    (iii) receiving said mean holding time corresponding to each of said sets of data chunks in said data buffer, and averaging a predetermined number of said mean holding times within a time window, so as to produce a smoothed mean holding time.

21. A method according to claim 20, further including the step of calculating a total holding time $T_N$ for N data chunks in said data buffer at a time that an $N^{th}$ data chunk is stored in said data buffer, said total holding time $T_N$ including a sum of a next preceding total holding time $T_{N-1}$, an aging term $E_N$, and a chunk holding term $C_N$.

22. A method according to claim 20, further including the steps of calculating a mean holding time $H_N$ for N data chunks in said data buffer at a time that an $N^{th}$ data chunk is stored in said data buffer, said mean holding time $H_N$ including a product of said total holding time $T_N$ and $1/N$.

23. A method according to claim 22, further including the step of initiating a transfer of said data chunks in said data buffer to said playout destination when said mean holding time $H_N$ equals or exceeds a predetermined holding time goal.

24. A method according to claim 20, further including the step of associating an arrival time with each of said data chunks according to a playout clock associated with said playout destination.

25. A method according to claim 20, further including the step of calculating for each of said data chunks, upon playout of said data chunks, a chunk holding time being a difference between a head playout time and an arrival time of said data chunk.

26. A method according to claim 25, further including the step of calculating, for a set of K data chunks, a mean holding time being a product of (a) a sum of K chunk holding times corresponding to said set of K data chunks, and (b) 1/K.

27. A method according to claim 26, further including the step of calculating, for a set of J mean holding times, a smoothed mean holding time being a product of (a) a sum of J mean holding times and (b) 1/J.

28. A method according to claim 20, further including the steps of receiving said mean holding time, said smoothed mean holding time and a holding time goal, and providing a playout adjustment signal to said playout destination for adjusting said playout rate, said playout adjustment signal being a predetermined function of said mean holding time, said smoothed mean holding time and said holding time goal.

29. A method according to claim 28, further including the steps of comparing said mean holding time to said holding time goal, providing an advance playout command via said adjustment signal if said mean holding time is larger than said holding time goal, and providing a retard playout command via said adjustment signal if said mean holding time is smaller than said holding time goal.

30. A method according to claim 28, further including the steps of comparing said smoothed mean holding time to said holding time goal, providing an advance playout command via said adjustment signal if said smoothed mean holding time is larger than said holding time goal, and providing a retard playout command via said adjustment signal if said smoothed mean holding time is smaller than said holding time goal.

31. A method according to claim 28, further including the steps of comparing said mean holding time to said holding time goal so as to produce a comparison value, and providing said adjustment signal such that an adjustment magnitude corresponds to said comparison value.

32. A method according to claim 20, further including the steps of adjusting a chunk holding time goal by:
(i) determining, for each data chunk, an arrival margin by which said data chunk either (a) achieves storage in said data buffer prior to playout, or (b) avoids storage in said data buffer due to missing said playout deadline;
(ii) sorting said arrival margins into a predetermined set of arrival margin bins; and,
(iii) adjusting said chunk holding time goal as a predetermined function of said sorted arrival margins.

33. An apparatus for recovering temporal alignment of digitally encoded speech chunks having a natural temporal order, transmitted over a packet-switched data network providing best-effort connectionless service such that said packets conveyed thereby are subject to transit delay, variation in transit delay from one packet to another, packet loss, packet duplication, and out-of-order packet delivery, the apparatus comprising:
a first software module for (a) storing speech data packets in a data buffer as said packets arrive from a data network and (b) retrieving said data packets from said data buffer in said natural temporal order and at a time at which said speech data packets should be played out to a receiving party; and
a second software module for (a) measuring and (b) adjusting an average time that said speech data packets spend in storage, so as to balance an additional delay with an occurrence of said speech data that arrives from said data network too late for playout, and
wherein the first software module recovers the sequence in which said encoded speech data is played out by storage of said speech chunks in a Jitter Buffer, according to a relative playout time value provided by a packet protocol header, and independent of a packet arrival order, and furthermore said Jitter Buffer is divided into storage partitions into each of which encoded speech data representing a known time interval is stored, and said time interval is configurable according to a speech encoding method in use.

34. An apparatus according to claim 33, wherein said storage partitions are arranged by a software module in a fixed order representing said natural temporal order.

35. An apparatus according to claim 33, wherein each frame received in a packet on the data network is stored in an individual storage partition of the Jitter Buffer.

36. An apparatus according to claim 33, wherein samples received in a packet on said data network are distributed into said storage partitions of the Jitter Buffer such that each partition contains an amount of data representing a selected partition time interval.

37. An apparatus according to claims 36, wherein a selection of storage partitions is made with reference to information about an encoder's relative sampling time included in the packet header by the transmitter.

38. An apparatus according to claim 33, wherein said apparatus decoding and playing out speech maintains a playout clock, advancing in step with speech playout, and each said storage partition is labeled with a value of said playout clock when said partition is filled with data, for the purpose of measuring the time the data spends in storage between arrival and playout.

39. An apparatus according to claim 33, wherein the average time spent in storage by encoded speech data is measured by processing the storage time of the data in each successive storage partition with accumulate-and-dump and/or sliding window averaging and smoothing algorithms to reduce fluctuations due to stochastic variations in packet delay.

* * * * *